US012570785B2

(12) United States Patent
Yamashita et al.

(10) Patent No.: US 12,570,785 B2
(45) Date of Patent: Mar. 10, 2026

(54) THERMOPLASTIC POLYURETHANE RESIN ELASTOMERS

(71) Applicant: MITSUBISHI CHEMICAL CORPORATION, Tokyo (JP)

(72) Inventors: Ryo Yamashita, Tokyo (JP); Teruhiko Ohara, Tokyo (JP); Mitsuharu Kobayashi, Tokyo (JP); Takayuki Yamanaka, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 580 days.

(21) Appl. No.: 17/506,724

(22) Filed: Oct. 21, 2021

(65) Prior Publication Data

US 2022/0041790 A1 Feb. 10, 2022

Related U.S. Application Data

(63) Continuation of application No. PCT/JP2020/017687, filed on Apr. 24, 2020.

(30) Foreign Application Priority Data

Apr. 24, 2019 (JP) ................................ 2019-083088
Apr. 24, 2019 (JP) ................................ 2019-083089

(51) Int. Cl.

| | |
|---|---|
| ***C08G 18/28*** | (2006.01) |
| ***C08G 18/08*** | (2006.01) |
| ***C08G 18/24*** | (2006.01) |
| ***C08G 18/32*** | (2006.01) |
| ***C08G 18/44*** | (2006.01) |
| ***C08G 18/66*** | (2006.01) |
| ***C08G 18/75*** | (2006.01) |
| ***C08G 64/30*** | (2006.01) |
| ***C08J 5/18*** | (2006.01) |
| ***D01D 5/08*** | (2006.01) |
| ***D01F 6/70*** | (2006.01) |
| ***D06N 3/14*** | (2006.01) |

(52) U.S. Cl.

CPC ..... *C08G 18/2815* (2013.01); *C08G 18/0895* (2013.01); *C08G 18/242* (2013.01); *C08G 18/3206* (2013.01); *C08G 18/44* (2013.01); *C08G 18/664* (2013.01); *C08G 18/758* (2013.01); *C08G 64/305* (2013.01); *C08J 5/18* (2013.01); *D01D 5/08* (2013.01); *D01F 6/70* (2013.01); *D06N 3/14* (2013.01); *C08J 2375/06* (2013.01)

(58) Field of Classification Search

CPC .. C08G 18/2815; C08G 18/44; C08G 64/305; C08G 18/0895; C08G 18/3206; C08G 18/664; C08G 18/758; C08G 18/242; C08J 5/18; C08J 2375/06; D01D 5/08; D06N 3/14; D01F 6/70

See application file for complete search history.

(56) References Cited

U.S. PATENT DOCUMENTS

| | | | |
|---|---|---|---|
| 6,472,442 | B1 | 10/2002 | Masubuchi |
| 9,018,319 | B2 | 4/2015 | Kanagawa et al. |
| 10,316,130 | B2 | 6/2019 | Kusano et al. |
| 10,696,865 | B2 | 6/2020 | Ito et al. |
| 11,220,572 | B2 | 1/2022 | Kusano et al. |

(Continued)

FOREIGN PATENT DOCUMENTS

| | | |
|---|---|---|
| CN | 102933629 A | 2/2013 |
| CN | 104884499 A | 9/2015 |

(Continued)

OTHER PUBLICATIONS

International Search Report issued Jul. 21, 2020 in PCT/JP2020/017687 (with English translation), 7 pages.

(Continued)

*Primary Examiner* — Rabon A Sergent

(74) *Attorney, Agent, or Firm* — Element IP, PLC

(57) ABSTRACT

A thermoplastic polyurethane resin elastomer is obtained by reacting an isocyanate compound (I), an aliphatic alcohol (II) having a number average molecular weight determined from the hydroxyl value of less than 300 and having only a hydroxyl group as a functional group, and a polyol (III) having a number average molecular weight determined from the hydroxyl value of not less than 300 and not more than 10,000. The isocyanate compound (I) includes not less than 90 mol % in total of an aliphatic isocyanate compound containing two isocyanate groups and/or an alicyclic isocyanate compound containing two isocyanate groups. The aliphatic alcohol (II) includes not less than 90 mol % of a C12 or lower aliphatic diol. The polyol (III) includes not less than 80 mol % of a copolymerized polycarbonate diol (IIIA) including a linear repeating structural unit represented by formula (A) and a repeating structural unit represented by formula (B).

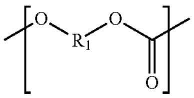

(A)

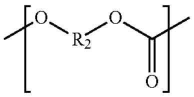

(B)

25 Claims, No Drawings

(56) References Cited

U.S. PATENT DOCUMENTS

| | | | |
|---|---|---|---|
| 2010/0261852 | A1 | 10/2010 | Masubuchi et al. |
| 2013/0102723 | A1 | 4/2013 | Wamprecht et al. |
| 2014/0303330 | A1 | 10/2014 | Kanagawa et al. |
| 2018/0094164 | A1 | 4/2018 | Ito et al. |
| 2019/0330421 | A1 | 10/2019 | Kanamori et al. |
| 2022/0073673 | A1 | 3/2022 | Kusano et al. |

FOREIGN PATENT DOCUMENTS

| | | | |
|---|---|---|---|
| CN | 105452332 | A | 3/2016 |
| DE | 102014226785 | A1 | 7/2015 |
| EP | 0302712 | A2 | 2/1989 |
| EP | 0302712 | A3 | 2/1989 |
| EP | 1288241 | A1 | 3/2003 |
| EP | 2213695 | A1 | 8/2010 |
| EP | 2213696 | A1 | 8/2010 |
| EP | 3029086 | B1 | 9/2023 |
| JP | H02-289616 | A | 11/1990 |
| JP | H03207712 | A | 9/1991 |
| JP | H04332717 | A | 11/1992 |
| JP | H04342747 | A | 11/1992 |
| JP | H0551428 | A | 3/1993 |
| JP | 2001234005 | A | 8/2001 |
| JP | 2001247762 | A | 9/2001 |
| JP | 2001253979 | A | 9/2001 |
| JP | 2001253980 | A | 9/2001 |
| JP | 2001261772 | A | 9/2001 |
| JP | 2004059706 | A | 2/2004 |
| JP | 2005272558 | A | 10/2005 |
| JP | 2010254755 | A | 11/2010 |
| JP | 2012079902 | | 4/2012 |
| JP | 2012079902 | A | 4/2012 |
| JP | 2012153854 | A | 8/2012 |
| JP | 2012158644 | A | 8/2012 |
| JP | 2012172010 | A | 9/2012 |
| JP | 2013095895 | | 5/2013 |
| JP | 2013095895 | A | 5/2013 |
| JP | 2014185320 | A | 10/2014 |
| JP | 2015081278 | A | 4/2015 |
| JP | 2015143316 | A | 8/2015 |
| JP | 2017128675 | | 7/2017 |
| JP | 2017128675 | A | 7/2017 |
| JP | 2017137406 | A | 8/2017 |
| JP | 2018009156 | A | 1/2018 |
| JP | 2018053193 | A | 4/2018 |
| JP | 2018104486 | A | 7/2018 |
| KR | 20100031157 | | 3/2010 |
| KR | 1020100031157 | A | 3/2010 |
| WO | WO-2009063767 | A1 | 5/2009 |
| WO | WO-2014104134 | A1 | 7/2014 |
| WO | WO-2014144839 | A1 | 9/2014 |
| WO | WO-2016091730 | A1 | 6/2016 |
| WO | WO-2016091730 | A9 | 7/2017 |
| WO | WO-2018088575 | A1 | 5/2018 |
| WO | WO-2020218507 | A1 | 10/2020 |

OTHER PUBLICATIONS

Office Action issued Nov. 8, 2022 in Japanese Patent Application No. 2021-516260 (with English translation), 16 pages.
Combined Chinese Office Action and Search Report issued Jan. 19, 2023 in Patent Application No. 202080030795.4 (with English translation), 16 pages.
Extended European Search Report issued May 12, 2022 in Patent Application No. 20794940.5, 13 pages.
Combined Chinese Office Action and Search Report issued Aug. 24, 2023 in Patent Application No. 202080030795.4 (with English translation), 18 pages.
Zhu Wanqiang, "Basic Paint Tutorial", Southwest Jiaotong University Press, Jun. 2012, pp. 28-29 (with Statement of Relevance).
Office Action issued Mar. 19, 2024 in corresponding Chinese Patent Application No. 202080030765.4 (with machine English translation), 31 pages.
Office Action issued Jul. 30, 2024 in corresponding Japanese Patent Application No. 2023-112871 (with machine English translation), 6 pages.
Office Action issued Jan. 7, 2025, in corresponding Japanese Patent Application No. 2023-112871 (with machine English translation), 8 pages.
Office Action issued Jan. 28, 2025, in corresponding Japanese Patent Application No. 2023-112870 (with machine English translation), 12 pages.

THERMOPLASTIC POLYURETHANE RESIN ELASTOMERS

CROSS-REFERENCE TO RELATED APPLICATIONS

The present application is a continuation application of International Application No. PCT/JP2020/017687, filed Apr. 24, 2020, which claims priority to Japanese Patent Application No. 2019-083088 filed Apr. 24, 2019, and to Japanese Patent Application No. 2019-083089 filed Apr. 24, 2019. The contents of these applications are incorporated herein by reference in their entirety.

TECHNICAL FIELD

The present invention relates to a thermoplastic polyurethane resin elastomer and an environmentally responsive biomass thermoplastic polyurethane resin elastomer that are each capable of giving non-yellowing thermoplastic polyurethane films and other shaped articles which have special mechanical properties required in various applications, specifically, show a small change in elastic modulus depending on temperature and have a constant tensile strength, and which at the same time have excellent durability properties such as weather resistance and chemical resistance, high transparency and good texture. The present invention also relates to a method for producing such thermoplastic polyurethane resin elastomers, and to articles using such elastomers, such as thermoplastic polyurethane film articles, films for clothing, polyurethane elastic fibers, films for automobile exteriors, and synthetic leather sheets for interiors.

BACKGROUND ART

Thermoplastic polyurethane resin elastomers (TPU) are block copolymers that are composed of a hard segment formed by the reaction of a short-chain diol as a chain extender with a diisocyanate, and a soft segment formed by the reaction of a polyol with a diisocyanate. In TPU, these two segments exist as separate microphases without being compatibilized with each other, and form a higher-order structure composed of hard segment domains that are crystal phases formed by intermolecular cohesive force mainly stemming from hydrogen bonds, and a matrix that is based on the soft segment domains and shows high mobility on account of weak intermolecular force (Van der Waals force) (Non Patent Literature 1, p. 147).

General elastomers are characterized by:

1) being shaped without vulcanization unlike rubbers,
2) offering wide ranges of hardness and elasticity,
3) being self-reinforced and easy to color, and
4) being recyclable. While TPU have all these characteristics (Non Patent Literature 1, p. 145), some of the simple thermoplastic polyurethane resins having thermoplasticity do not satisfy the above four characteristics.

TPU have excellent characteristics such as mechanical strength, elastic characteristics, abrasion resistance and oil resistance compared to other thermoplastic resins (TPE), for example, polyester resins (TPEE), polyamide resins (TPAE), styrene resins (SBC), olefin resins (TPO) and vinyl chloride resins (TPVC). Thus, shaped articles produced from TPU by extrusion such as films, sheets, tubes and pipes, and other various shaped articles obtained by processes such as injection molding have found use in numerous applications. Exemplary applications of extruded articles include pressure resistant hoses, fire hoses, conveying belts, round belts, keyboards, hot-melt films, impermeable sheets, air belts and life preservers. Exemplary applications of injection molded articles include casters, gears, electric plugs, snow chains, sports shoes and watch bands.

TPU are generally obtained by reacting a diisocyanate compound, a short-chain diol and a long-chain diol. In particular, TPU that are most widely used are those obtained from raw materials including aromatic 4,4'-diphenylmethane diisocyanate (MDI) as an isocyanate compound and 1,4-butanediol (14BG) as a chain extender.

Long-chain diols may be classified into polyester diols, polyether diols and polycarbonate diols. Polyester diols are excellent in mechanical strength and abrasion resistance, but are poor in hydrolysis resistance. Polyether diols have excellent hydrolysis resistance, antibacterial properties and low-temperature flexibility, but are low in heat resistance, chemical resistance and weather resistance. Polycarbonate diols are excellent in hydrolysis resistance, heat resistance and weather resistance, but have a drawback in that they have high viscosity and are difficult to handle.

Thus, the long-chain diols are selected appropriately from polyester diols, polyether diols and polycarbonate diols in accordance with characteristics of the thermoplastic polyurethane resin elastomers that are required. Polycarbonate diols are used when durability is more important for the thermoplastic polyurethane resin elastomers. However, thermoplastic polyurethane resin elastomers having, as a structural unit, homopolycarbonate diol of 1,6-hexanediol show insufficient chemical resistance and are unsatisfactory in transparency and mechanical properties such as elastic modulus depending on applications.

In recent years, biomass thermoplastic polyurethane resin elastomers that are obtained using less fossil resources and thereby reduce the emissions of carbon dioxide are strongly demanded in order to protect the global environment and to achieve sustainable growth.

In thermoplastic polyurethane resin elastomers using biomass resources, it is generally known to use biomass polyester polyols synthesized from succinic acid of biomass origin. Unfortunately, these elastomers are used in limited fields because of their low durability such as hydrolysis resistance and chemical resistance.

In recent years, elastomers are provided which use biomass polyether polyols, for example, polytetramethylene ether glycol (PTMG) instead of biomass polyester polyols. While these elastomers are improved in hydrolysis resistance and flexibility as compared with thermoplastic polyurethane resin elastomers using polyester polyols, their chemical resistance, heat resistance and weather resistance are inferior.

Further, most of the biomass resources come from edible corns and conflict with human food problems. Thus, non-yellowing thermoplastic resin elastomers are desired that are made from non-edible biomass resources and thus do not conflict with food problems, and are highly environmentally friendly and excellent in various properties.

In recent years, thermoplastic polyurethane resin elastomers are also used in films for protecting base materials such as automobile instrument panels and automobile exterior surfaces, synthetic leather films for automobile interiors, waterproof films and moisture-permeable waterproof films for clothing, hot melt adhesives such as interlining adhesives, waterproof sealing tapes, and sports equipment such as sports shoes, outdoor sports clothing and golf ball skin materials. In these applications, greater importance is placed on having special mechanical properties, specifically, showing a small change in elastic modulus depending on temperature and having a constant tensile strength, and further on concurrently having excellent properties such as weather resistance, light resistance, chemical resistance, stain resistance and other durability, transparency and texture.

Patent Literature 1 proposes a thermoplastic polyurethane resin elastomer characterized by using a chain extender having an aromatic group. This elastomer is based on a polycarbonate diol derived from 1,6-hexanediol and shows shape memory at room temperature and above.

Patent Literature 2 proposes a thermoplastic polyurethane resin elastomer improved in flexibility, strength and water resistance. This polyurethane elastomer includes a main agent obtained by reacting a polycarbonate polyol, a polyether polyol and an aromatic polyisocyanate compound, and a curing agent such as 1,4-butanediol.

Patent Literature 3 proposes a polyurethane having a good balance between chemical resistance and low-temperature characteristics. This polyurethane is based on a polycarbonate diol derived from a long-chain linear diol such as 1,10-decanediol. Patent Literature 3 does not explicitly describe any specific compositions of thermoplastic polyurethane resin elastomers that contribute to the advantageous effects of the present invention.

Patent Literature 4 describes that in a laminate film for automobiles such as rear fenders, the intimate contact and followability to three-dimensional curved surfaces at the time of application are critically affected by the stress relaxation properties of a thermoplastic polyurethane film used as a base of the laminate film.

Patent Literature 5 proposes a laminate film with excellent weather resistance and heat resistance that is mainly used for a paint protection film. This film includes a polycarbonate-based thermoplastic polyurethane film, a urethane acrylate topcoat layer and a pressure-sensitive adhesive. The description of Patent Literature 5 does not suggest any specific structure of a polycarbonate diol that contributes to the advantageous effects of the present invention.

Patent Literature 1: JP2004-59706A
Patent Literature 2: JP2015-081278A
Patent Literature 3: JP2014-185320A
Patent Literature 4: JP2005-272558A
Patent Literature 5: JP2018-053193A There are demands that thermoplastic polyurethane resin elastomers should show special mechanical properties required in various applications, specifically, exhibit a small change in elastic modulus depending on temperature and have a constant tensile strength, and at the same time should be further enhanced in durability such as weather resistance and chemical resistance, and in transparency and texture. From the point of view of environmental protection such as global warming control, there are demands for highly functional non-yellowing thermoplastic polyurethane resin elastomers of biomass origin, especially non-edible plant origin. The concurrent satisfaction of the above special mechanical characteristics and durability such as chemical resistance is particularly important in thin films and sheets and also in fibers because any undesired consequences such as discoloration, chipping and breakage destroy the usability of the products.

The conventional thermoplastic polyurethane resin elastomers proposed in literature such as Patent Literature 1 and Patent Literature 2 encounter difficulties in concurrently satisfying flexibility and durability. The elastomer of Patent Literature 1 attains enhanced durability by being based on a polycarbonate, but is poor in flexibility and impact resistance.

The thermoplastic polyurethane resin elastomer obtained in Patent Literature 2 attains enhanced flexibility by blending of a polycarbonate with a polyalkylene ether glycol. However, polytetramethylene ether glycol used as the polyalkylene ether glycol has high crystallinity, and thus the elastomer lacks transparency and flexibility at low temperatures, and is also poor and insufficient in durability compared to when the polycarbonate diol is used alone.

Patent Literature 3 proposes a polyurethane using a polycarbonate diol derived from 1,10-decanediol, but does not explicitly describe any specific compositions or effects of thermoplastic polyurethane resin elastomers.

SUMMARY OF INVENTION

An object of the present invention is to provide a thermoplastic polyurethane resin elastomer and an environmentally responsive biomass thermoplastic polyurethane resin elastomer that are each capable of giving non-yellowing thermoplastic polyurethane films and other shaped articles which have special mechanical properties required in various applications, specifically, show a small change in elastic modulus depending on temperature and have a constant tensile strength, and which at the same time have excellent durability properties such as weather resistance and chemical resistance, high transparency and good texture. Other objects of the present invention are to provide a method for producing such thermoplastic polyurethane resin elastomers, and to provide articles using the thermoplastic polyurethane resin elastomers, such as thermoplastic polyurethane film articles, films for clothing, polyurethane elastic fibers, films for automobile exteriors, decorative films for interiors and exteriors, and synthetic leather sheets for interiors.

The present inventors have found that a thermoplastic polyurethane resin elastomer obtained using a specific copolymerized polycarbonate diol, a specific polyisocyanate and a specific aliphatic alcohol in a specific ratio can solve the problems discussed hereinabove.

The present invention is summarized as follows.

[1] A thermoplastic polyurethane resin elastomer obtained by reacting an isocyanate compound (I), an aliphatic alcohol (II) having a number average molecular weight determined from the hydroxyl value of less than 300 and having only a hydroxyl group as a functional group, and a polyol (III) having a number average molecular weight determined from the hydroxyl value of not less than 300 and not more than 10,000, wherein
 the isocyanate compound (I) comprises not less than 90 mol % in total of an aliphatic isocyanate compound containing two isocyanate groups and/or an alicyclic isocyanate compound containing two isocyanate groups,
 the aliphatic alcohol (II) having a number average molecular weight determined from the hydroxyl value of less than 300 and having only a hydroxyl group as a functional group comprises not less than 90 mol % of a C12 or lower aliphatic diol,
 the polyol (III) comprises not less than 80 mol % of a copolymerized polycarbonate diol (IIIA) including a linear repeating structural unit represented by the formula (A) below (hereinafter, written as the "repeating unit (A)") and a repeating structural unit represented by the formula (B) below (hereinafter, written as the "repeating unit (B)"),
 the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0-5.5:1.0-4.5 (with the proviso that 0.95≤(EI)/((EII)+(EIII))≤1.05), and the number average molecular weight determined from the hydroxyl value of the copolymerized polycarbonate diol (IIIA) is not less than 500 and not more than 5,000,

[Chem. 1]

(A)

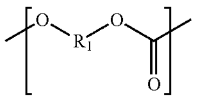

(B)

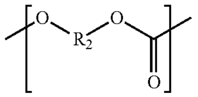

wherein the formula (A) above represents a structural unit derived from a transesterification reaction product of a C3-C5 hydrocarbon diol and a carbonate ester, and the formula (B) above represents a structural unit derived from a transesterification reaction product of a C6-C20 hydrocarbon diol and a carbonate ester.

[2] The thermoplastic polyurethane resin elastomer according to [1], wherein the equivalent ratio is 0.97≤(EI)/((EII)+(EIII))≤1.03 wherein (EIII) is the hydroxyl equivalent of the polyol (III), (EI) is the isocyanate equivalent of the isocyanate compound (I), and (EII) is the hydroxyl equivalent of the aliphatic alcohol (II).

[3] The thermoplastic polyurethane resin elastomer according to [1] or [2], wherein the isocyanate compound (I) comprises not less than 80 mol % of an alicyclic isocyanate compound containing two isocyanate groups.

[4] The thermoplastic polyurethane resin elastomer according to any one of [1] to [3], wherein the repeating unit (B) is a structural unit derived from a transesterification reaction product of a C8-C20 hydrocarbon diol and a carbonate ester.

[5] The thermoplastic polyurethane resin elastomer according to any one of [1] to [4], wherein the repeating unit (A) is a structural unit derived from a transesterification reaction product of one or more of 1,3-propanediol, 1,4-butanediol and 1,5-pentanediol with a carbonate ester.

[6] The thermoplastic polyurethane resin elastomer according to any one of [1] to [5], wherein the repeating unit (B) is a structural unit derived from a transesterification reaction product of one or more of 1,12-dodecanediol, 1,10-decanediol, 1,9-nonanediol, 1,8-octanediol and 1,6-hexanediol with a carbonate ester.

[7] The thermoplastic polyurethane resin elastomer according to any one of [1] to [6], wherein the aliphatic isocyanate compound and/or the alicyclic isocyanate compound each containing two isocyanate groups in the molecule is one, or two or more selected from the group consisting of 1,6-hexamethylene diisocyanate, 4,4'-dicyclohexylmethane diisocyanate, 1,3-bis(isocyanatomethyl)cyclohexane, 1,5-pentamethylene diisocyanate and isophorone diisocyanate.

[8] The thermoplastic polyurethane resin elastomer according to any one of [1] to [7], wherein the aliphatic alcohol (II) is one, or two or more selected from the group consisting of ethylene glycol, 1,3-propanediol, 1,4-butanediol, 1,5-pentanediol and 1,6-hexanediol.

[9] A thermoplastic polyurethane resin elastomer obtained by reacting an isocyanate compound (I), an aliphatic alcohol (II) having a number average molecular weight determined from the hydroxyl value of less than 300 and having only a hydroxyl group as a functional group, and a polyol (III) having a number average molecular weight determined from the hydroxyl value of not less than 300 and not more than 10,000, wherein the isocyanate compound (I) comprises not less than 90 mol % in total of an aliphatic isocyanate compound containing two isocyanate groups and/or an alicyclic isocyanate compound containing two isocyanate groups, the aliphatic alcohol (II) having a number average molecular weight determined from the hydroxyl value of less than 300 and having only a hydroxyl group as a functional group comprises not less than 90 mol % of a C12 or lower aliphatic diol, the polyol (III) comprises not less than 80 mol % of a copolymerized polycarbonate diol (IIIA), the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0-5.5:1.0-4.5 (with the proviso that 0.95≤(EI)/((EII)+(EIII))≤1.05), the number average molecular weight determined from the hydroxyl value of the copolymerized polycarbonate diol (IIIA) is not less than 500 and not more than 5,000, and the content of a biomass resource in the thermoplastic polyurethane resin elastomer is not less than 10 mass %.

[10] The thermoplastic polyurethane resin elastomer according to [9], wherein the content of a biomass resource of non-edible plant origin in raw material diols for the polyol (III) is not less than 10 mass %.

[11] The thermoplastic polyurethane resin elastomer according to any one of [1] to [10], wherein when the thermoplastic polyurethane resin elastomer is formed into a strip specimen in accordance with JIS K6301 (2010) having a width of 10 mm, a length of 100 mm and a thickness of about 50 μm, and when the specimen is tensile tested on a tensile tester (product name: "Tensilon UTM-III-100", manufactured by Orientec Co., Ltd.) from a chuck distance of 50 mm at a stress rate of 500 mm/min, temperatures of 23° C. and 40° C. and a relative humidity of 55% to determine the stress at 100% elongation (100% modulus), the strength ratio (by percentage) of the 100% modulus measured at 40° C. to the 100% modulus measured at 23° C. is not less than 70%, and wherein the mass change is not more than 40% as measured in the following manner: a 3 cm×3 cm specimen is cut out from a film including the thermoplastic polyurethane resin elastomer; the weight of the specimen is measured with a precision balance; the specimen is then added to a 250 ml volume glass bottle containing 50 ml of oleic acid as a test solvent, and is allowed to stand in a nitrogen atmosphere in a thermostatic chamber at 80° C. for 16 hours: after the test, the specimen is taken out; the front and back sides are lightly wiped with a paper wiper; and the mass is measured with the precision balance to calculate the mass change (the rate of increase) from the mass before the test.

[12] A method for producing a thermoplastic polyurethane resin elastomer comprising reacting an isocyanate compound (I), an aliphatic alcohol (II) having a number average molecular weight determined from the hydroxyl value of less than 300 and having only a hydroxyl group as a functional group, and a polyol (III) having a number average molecular weight determined from the hydroxyl value of not less than 300 and not more than 10,000, wherein the isocyanate compound (I) comprises not less than 90 mol % in total of an aliphatic isocyanate compound containing two isocyanate groups and/or an alicyclic isocyanate compound containing two isocyanate groups, the aliphatic alcohol (II) having a number average molecular weight determined from the hydroxyl value of less than 300 and having only a hydroxyl group as a functional group comprises not less than 90 mol % of a C12 or lower aliphatic diol, the polyol (III) comprises not less than 80 mol % of a copolymerized polycarbonate diol (IIIA) including a linear repeating structural unit represented by the formula (A) below (hereinafter, written as the "repeating unit (A)") and a repeating structural unit represented by the formula (B) below (hereinafter, written as the "repeating unit (B)"), and the equivalent ratio of the hydroxyl equivalent (EIII) of the polyol (III), the isocyanate equivalent (EI) of the isocyanate compound (I) and the hydroxyl equivalent (EII) of the aliphatic alcohol (II) in the reaction is $0.95 \leq (EI)/((EII)+(EIII)) \leq 1.05$,

[Chem. 2]

(A)

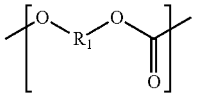

(B)

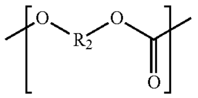

wherein the formula (A) above represents a structural unit derived from a transesterification reaction product of a C3-C5 hydrocarbon diol and a carbonate ester, and the formula (B) above represents a structural unit derived from a transesterification reaction product of a C6-C20 hydrocarbon diol and a carbonate ester.

[13] The method according to [12] for producing a thermoplastic polyurethane resin elastomer, wherein the isocyanate compound (I), the aliphatic alcohol (II) and the polyol (III) are mixed with one another sufficiently by rapid stirring without a solvent, and the mixture is supplied to a device in which the mixture is continuously mixed, reacted and extruded, thereby producing a thermoplastic polyurethane resin elastomer continuously.

[14] A thermoplastic polyurethane resin elastomer composition comprising the thermoplastic polyurethane resin elastomer described in any one of [1] to [11], and one, or two or more kinds of additives selected from the group consisting of hindered phenolic antioxidants, UV absorbers, light stabilizers and lubricants.

[15] A thermoplastic polyurethane film article with a thickness of 30 μm to 2 mm obtained using the thermoplastic polyurethane resin elastomer described in any one of [1] to [11] or the thermoplastic polyurethane resin elastomer composition described in [14].

[16] A film for automobile exteriors, a decorative film for interiors and exteriors, or a synthetic leather sheet for interiors obtained using the thermoplastic polyurethane resin elastomer film article described in [15].

[17] A film for clothing obtained by shaping the thermoplastic polyurethane resin elastomer described in any one of [1] to [11] or the thermoplastic polyurethane resin elastomer composition described in [14].

[18] A polyurethane elastic fiber obtained by melt-spinning the thermoplastic polyurethane resin elastomer described in any one of [1] to [11] or the thermoplastic polyurethane resin elastomer composition described in [14].

Advantageous Effects of Invention

The thermoplastic polyurethane resin elastomers provided according to the present invention are non-yellowing thermoplastic polyurethane resin elastomers and environmentally responsive biomass non-yellowing thermoplastic polyurethane resin elastomers which each have special mechanical properties required in various applications, specifically, show a small change in elastic modulus depending on temperature and have a constant tensile strength, and which at the same time have excellent durability properties such as weather resistance and chemical resistance, high transparency and good texture. Shaped articles of such elastomers are also provided.

In the present invention, the term "durability" means chemical resistance, weather resistance, and the resistance to other various chemical and physical influences.

DESCRIPTION OF EMBODIMENTS

Hereinbelow, embodiments of the present invention will be described in detail. The present invention is not limited to those embodiments below, and various modifications are possible within the scope of the invention.

[Raw Material Compounds for Thermoplastic Polyurethane Resin Elastomers]

Raw material compounds used for the production of a thermoplastic polyurethane resin elastomer of the present invention will be described below.

<Isocyanate Compounds (I)>

An isocyanate compound (I) is used as a raw material for producing a thermoplastic polyurethane resin elastomer of the present invention. The isocyanate compound (I) comprises not less than 90 mol % in total of an aliphatic isocyanate compound containing two isocyanate groups and/or an alicyclic isocyanate compound containing two isocyanate groups. Examples thereof include various known aliphatic polyisocyanate compounds and alicyclic polyisocyanate compounds.

In particular, the isocyanate compound (I) preferably comprises not less than 80 mol % of an alicyclic isocyanate compound containing two isocyanate groups. In this case, a thermoplastic polyurethane resin elastomer that is obtained advantageously attains excellent properties such as, transparency and abrasion resistance.

Examples of the isocyanate compounds (I) include aliphatic diisocyanate compounds such as tetramethylene diisocyanate, hexamethylene diisocyanate, 2,2,4-trimethylhexamethylene diisocyanate, 2,4,4-trimethylhexamethylene diisocyanate, lysine diisocyanate, and dimer diisocyanates obtained by converting the carboxyl groups of dimer acids into isocyanate groups; and alicyclic diisocyanate compounds such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate (H12MDI) and 1,3-bis(isocyanatomethyl)cyclohexane (1,4-H6XDI).

These may be used singly, or two or more may be used in combination. In the case of combined use, the major component is preferably an isocyanate compound containing two isocyanate groups, and the content thereof is preferably not less than 90 mol %, more preferably not less than 95 mol %, and most preferably not less than 98 mol %. If the content of the major isocyanate compound is less than 90 mol %, properties such as mechanical properties and chemical resistance may be deteriorated.

The isocyanate compounds (I) that are used may include an isocyanate compound containing one isocyanate group as long as the addition of such a compound does not cause a significant change in properties of a thermoplastic polyurethane resin elastomer that is obtained. When an isocyanate compound containing one isocyanate group is used in combination, the content thereof is preferably not more than 5 mol %, more preferably not more than 3 mol %, and most preferably not more than 1 mol % of the isocyanate compounds (I). If the content of the isocyanate compound containing one isocyanate group is more than 5 mol %, a thermoplastic polyurethane resin elastomer that is obtained has a lowered molecular weight and shows low durability such as chemical resistance.

The isocyanate compounds (I) that are used may include an isocyanate compound containing three or more isocyanate groups as long as the addition of such a compound does not cause a significant change in properties of a thermoplastic polyurethane resin elastomer that is obtained. When an isocyanate compound containing three or more isocyanate groups is used in combination, the content thereof is preferably not more than 3 mol %, more preferably not more than 1 mol %, and most preferably not more than 0.5 mol % of the isocyanate compounds (I). If the content of the isocyanate compound containing three or more isocyanate groups is more than 3 mol %, a thermoplastic polyurethane resin elastomer exhibits poor properties after being crosslinked or cannot be shaped well, or is gelled and cannot be polymerized.

The isocyanate compounds (I) that are used may include an isocyanate compound having an aromatic ring as long as the addition of such a compound does not cause a significant change in properties of a thermoplastic polyurethane resin elastomer that is obtained. When an isocyanate compound having an aromatic ring is used in combination, the content thereof is preferably not more than 10 mol %, more preferably not more than 5 mol %, and most preferably not more than 1 mol % of the isocyanate compounds (I). If the content of the isocyanate compound having an aromatic ring is more than 10 mol %, a thermoplastic polyurethane resin elastomer that is obtained exhibits poor weather resistance and low durability.

Among the isocyanate compounds (I) described above, 1,6-hexamethylene diisocyanate, 4,4'-dicyclohexylmethane diisocyanate, 1,3-bis(isocyanatomethyl)cyclohexane, 1,5-pentamethylene diisocyanate and isophorone diisocyanate are preferable from the point of view of the mechanical characteristics and durability of a thermoplastic polyurethane resin elastomer that is obtained, and also because such compounds are available in large amounts at low cost in the industry. 4,4'-Dicyclohexylmethane diisocyanate and 1,3-bis(isocyanatomethyl)cyclohexane are more preferable for the reason that a thermoplastic polyurethane resin elastomer that is obtained attains excellent properties such as weather resistance, light resistance, transparency, abrasion resistance and chemical resistance in terms of good balance.

From the point of view of environmentally responsive biomass resources, 1,5-pentane diisocyanate of biomass origin is preferable.

<Aliphatic Alcohols (II) Having Number Average Molecular Weight Determined from Hydroxyl Value of Less than 300 and Having Only Hydroxyl Group as Functional Group>

An aliphatic alcohol (II) having a number average molecular weight determined from the hydroxyl value of less than 300 and having only a hydroxyl group as a functional group is used as a raw material for producing a thermoplastic polyurethane resin elastomer of the present invention. This aliphatic alcohol comprises not less than 90 mol % of a C12 or lower aliphatic diol, serves as a chain extender, and is selected from low-molecular compound polyols having at least two active hydrogen atoms that react with isocyanate groups.

Hereinbelow, the "aliphatic alcohol (II) having only a hydroxyl group as a functional group" may be written as the "chain extender (II)".

The aliphatic alcohol (II) having a number average molecular weight determined from the hydroxyl value of less than 300 and having only a hydroxyl group as a functional group comprises not less than 90 mol % of a C12 or lower aliphatic diol. Any known aliphatic alcohols having only a hydroxyl group as a functional group may be used. Specific examples of the aliphatic alcohols (II) having number average molecular weight determined from hydroxyl value of less than 300 and having only hydroxyl group as functional group include linear diols such as ethylene glycol, 1,3-propanediol, 1,4-butanediol, 1,5-pentanediol, 1,6-hexanediol, 1,8-octanediol, 1,9-nonanediol, 1,10-decanediol and 1,12-dodecanediol; diols having a branched chain such as 2-methyl-1,3-propanediol, 2,2-dimethyl-1,3-propanediol, 2,2-diethyl-1,3-propanediol, 2-methyl-2-propyl-1,3-propanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol and dimer diols; diols having an ether group such as diethylene glycol and propylene glycol; diols having an alicyclic structure such as 1,4-cyclohexanediol, 1,4-cyclohexanedimethanol and 1,4-dihydroxyethylcyclohexane; and polyols such as glycerin, trimethylolpropane and pentaerythritol.

These chain extenders (II) may be used singly, or two or more may be used in combination. In the case of combined use, the major component is preferably a preferred diol described below, and the content thereof is preferably not less than 70 mol %, more preferably not less than 90 mol %, and most preferably not less than 98 mol % of the chain extenders (II). If the content of the main component is less than 70 mol % of the chain extenders (II), properties such as mechanical properties of a thermoplastic polyurethane resin elastomer that is obtained may be deteriorated.

Among the chain extenders (II) described above, linear aliphatic diols such as ethylene glycol, 1,3-propanediol, 1,4-butanediol, 1,5-pentanediol and 1,6-hexanediol are preferable for the reasons that a thermoplastic polyurethane resin elastomer that is obtained has excellent phase separation between soft segments and hard segments, and thereby attains excellent flexibility, has a high ratio of elastic moduli at temperatures in the range of 23° C. to 40° C., and exhibits excellent durability such as chemical resistance, and also that such chain extenders are available in large amounts at low cost in the industry. In particular, 1,3-propanediol, 1,4-butanediol, 1,5-pentanediol and 1,6-hexanediol are more preferable. The content of these preferred linear aliphatic diols in the chain extenders (II) is preferably not less than 90 mol %. If a diol having a side chain is used as the chain extender (II), the cohesive force of hard segments in a thermoplastic polyurethane resin elastomer that is obtained is lowered, and consequently the thermoplastic polyurethane resin elastomer that is obtained may exhibit lowered properties such as mechanical properties. Among these linear diols, 1,4-butanediol is more preferable in terms of the balance of properties. From the point of view of the origin from environmentally responsive biomass resources, 1,3-propanediol and 1,4-butanediol of biomass origin are more preferable, and 1,4-butanediol of biomass origin is most preferable in terms of the balance of properties.

An aliphatic monoalcohol compound containing one hydroxyl group may also be used as an additional aliphatic alcohol (II) having only a hydroxyl group as a functional group and having a number average molecular weight determined from the hydroxyl value of less than 300 as long as the addition of such a compound does not cause a significant change in properties of a thermoplastic polyurethane resin elastomer that is obtained. When an aliphatic monool compound containing one hydroxyl group is used in combination, the content thereof is preferably not more than 5 mol %, more preferably not more than 3 mol %, and most preferably not more than 1 mol % of the aliphatic alcohols (II). If the aliphatic monool compound represents more than 5 mol %, a thermoplastic polyurethane resin elastomer that is obtained has a lowered molecular weight and shows low durability such as chemical resistance.

An aliphatic polyhydric alcohol compound containing three or more hydroxyl groups such as glycerin, trimethylolpropane or pentaerythritol may also be used as an additional aliphatic alcohol (II) having only a hydroxyl group as a functional group and having a number average molecular weight determined from the hydroxyl value of less than 300 as long as the addition of such a compound does not cause a significant change in properties of a thermoplastic polyurethane resin elastomer that is obtained. When an aliphatic polyhydric alcohol compound containing three or more hydroxyl groups is used in combination, the content thereof is preferably not more than 3 mol %, more preferably not more than 1 mol %, and most preferably not more than 0.5 mol % of the aliphatic alcohols (II). If the aliphatic alcohol containing three or more hydroxyl groups represents more than 1 mol %, a thermoplastic polyurethane resin elastomer exhibits poor properties after being crosslinked or cannot be shaped well, or is gelled and cannot be polymerized.

An alcohol having an aromatic group or a compound containing active hydrogen other than the hydroxyl group, for example, a compound containing an amino group, a carboxyl group or the like may be used together with the aliphatic alcohol (II) having only a hydroxyl group as a functional group and having a number average molecular weight determined from the hydroxyl value of less than 300 as long as the addition of such a compound does not cause a significant change in properties of a thermoplastic polyurethane resin elastomer that is obtained. In the case of combined use, the content of such a compound is preferably not more than 5 mol %, more preferably not more than 3 mol %, and most preferably not more than 1 mol % relative to the aliphatic alcohol (II). Adding more than 5 mol % of such a compound other than the aliphatic alcohol (II) deteriorates the durability such as weather resistance, hue and hydrolysis resistance of a thermoplastic polyurethane resin elastomer that is obtained.

<Polyols (III) Having Number Average Molecular Weight Determined from Hydroxyl Value of not Less than 300 and not More than 10,000>

(Copolymerized Polycarbonate Diols (IIIA))

A polyol (III) having a number average molecular weight determined from the hydroxyl value of not less than 300 and not more than 10,000 is used as a raw material for producing a thermoplastic polyurethane resin elastomer of the present invention. The polyol (III) comprises not less than 80 mol % of a copolymerized polycarbonate diol (IIIA) described below.

The copolymerized polycarbonate diol (IIIA) has a linear repeating structural unit represented by the formula (A) below (hereinafter, written as the "repeating unit (A)") and a repeating structural unit represented by the formula (B) below (hereinafter, written as the "repeating unit (B)"), and has a number average molecular weight determined from the hydroxyl value of not less than 500 and not more than 5,000.

[Chem. 3]

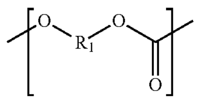

(A)

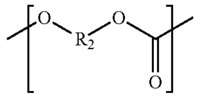

(B)

The above formula (A) represents a structural unit derived from a transesterification reaction product of a C3-C5 hydrocarbon diol and a carbonate ester.

The above formula (B) represents a structural unit derived from a transesterification reaction product of a C6-C20 hydrocarbon diol and a carbonate ester.

A thermoplastic polyurethane resin elastomer of the present invention is produced using, as a raw material, the above specific copolymerized polycarbonate diol (IIIA) having the repeating unit (A) and the repeating unit (B) while ensuring that the copolymerized polycarbonate diol (IIIA), the specific isocyanate compound (I) and the specific chain extender (II) have a specific compositional ratio. The thermoplastic polyurethane resin elastomer can give thermoplastic polyurethane resin elastomer shaped articles which have special mechanical properties required in various applications, specifically, show a small change in elastic modulus depending on temperature and have a constant tensile strength, and which at the same time have excellent durability properties such as weather resistance and chemical resistance, high transparency and good texture.

In the repeating unit (A) represented by the formula (A), $R_1$ is a C3-C5 hydrocarbon group. The repeating units (A) may be introduced into the copolymerized polycarbonate diol (IIIA) by using a C3-C5 hydrocarbon diol as a raw material diol for the copolymerized polycarbonate diol (IIIA).

From points of view such as industrial availability and excellent properties of films or shaped articles using a thermoplastic polyurethane resin elastomer that is obtained, it is particularly preferable that the repeating unit (A) be derived from linear 1,3-propanediol, 1,4-butanediol and/or 1,5-pentanediol. 1,3-Propanediol and 1,4-butanediol are particularly preferable in the case where a thermoplastic polyurethane resin elastomer will be used in an application in which chemical resistance is more important among other properties. 1,4-Butanediol also offering high mechanical properties is most preferable. From the point of view of the origin from environmentally responsive biomass resources, 1,3-propanediol and 1,4-butanediol of biomass origin are preferable.

In the repeating unit (B) represented by the formula (B), the number of carbon atoms in $R^2$ is 6 to 20, preferably 8 to 12, and particularly preferably 10. The repeating units (B) may be introduced into the copolymerized polycarbonate diol (IIIA) by using a C6-C20, preferably C8-C12, particularly preferably C10 hydrocarbon diol as a raw material diol for the copolymerized polycarbonate diol (IIIA).

Examples of the raw material diols for the repeating units (B) include linear 1,12-dodecanediol, 1,10-decanediol, 1,9-nonanediol, 1,8-octanediol and 1,6-hexanediol. From the point of view of environmentally responsive biomass resources, 1,9-nonanediol and 1,10-decanediol of biomass origin are preferable. 1,10-Decanediol is most preferable from the point of view of mechanical properties and chemical resistance of shaped articles using a thermoplastic polyurethane resin elastomer that is obtained, and also because it may be obtained from non-edible plant.

Preferred contents of biomass raw materials in the copolymerized polycarbonate diol (IIIA) will be described later.

The copolymerized polycarbonate diol (IIIA) may include only one kind, or two or more kinds of the repeating units (A), and may include only one kind, or two or more kinds of the repeating units (B). As long as the advantageous effects of the present invention are not impaired, the copolymerized polycarbonate diol (IIIA) may include repeating units other than the repeating units (A) and the repeating units (B) in an amount of, for example, not more than 20 mol % of all the repeating units.

In the copolymerized polycarbonate diol (IIIA), the molar ratio of the repeating units (B) to the repeating units (A) (repeating units (B)/repeating units (A), also written as the "molar ratio (B)/(A)") is preferably 0.03 to 99, more preferably 0.05 to 19, and particularly preferably 0.10 to 10. If the repeating units (A) are more and the repeating units (B) are less than the above range, films and shaped articles using a thermoplastic polyurethane resin elastomer that is obtained tend to be inferior in transparency and flexibility. If, on the other hand, the repeating units (A) are less and the repeating units (B) are more than the above range, films and shaped articles using a thermoplastic polyurethane resin elastomer that is obtained tend to exhibit lowered mechanical strength and chemical resistance.

The molar ratio (B)/(A) of the copolymerized polycarbonate diol (IIIA) is measured by the method described later in the section of EXAMPLES.

If the copolymerized polycarbonate diol (IIIA) is replaced by other copolymerized polycarbonate diol, for example, a copolymerized polycarbonate diol obtained using 1,3-propanediol and 1,4-butanediol as raw material diols, a thermoplastic polyurethane resin elastomer that is obtained is low in flexibility that is a characteristic of polyurethanes. If the copolymerized polycarbonate diol (IIIA) is replaced by a homopolycarbonate diol, for example, a homo type obtained using 1,6-hexanediol as the only raw material diol, a thermoplastic polyurethane resin elastomer that is obtained has lowered transparency due to the presence of crystallinity, and is disadvantageously unbalanced in properties and limited in applicability.

From the point of view of the mechanical characteristics of a thermoplastic polyurethane resin elastomer that is obtained, the number average molecular weight of the copolymerized polycarbonate diol (IIIA) determined from the hydroxyl value is preferably not less than 500 and not more than 5,000. If the number average molecular weight is less than 500, the thermoplastic polyurethane resin elastomer lacks flexibility that is a feature of thermoplastic polyurethane resin elastomers, and gives shaped articles having too high hardness. If the number average molecular weight is more than 5,000, shaped articles that are obtained have an excessively low elastic modulus and are poor in elastic recovery that is a feature of thermoplastic polyurethane resin elastomers. The number average molecular weight of the copolymerized polycarbonate diol (IIIA) is preferably not less than 800 and not more than 4,000, and more preferably not less than 1,000 and not more than 3,000.

Specifically, the number average molecular weight (Mn) of the copolymerized polycarbonate diol (IIIA) determined from the hydroxyl value is measured by the method described later in the section of EXAMPLES.

The lower limit of the hydroxyl value of the copolymerized polycarbonate diol (IIIA) is usually 22.4 mg-KOH/g, preferably 28.1 mg-KOH/g, and more preferably 37.4 mg-KOH/g, and the upper limit is usually 224.4 mg-KOH/g, preferably 140.3 mg-KOH/g, and more preferably 112.2 mg-KOH/g.

Specifically, the hydroxyl value of the copolymerized polycarbonate diol (IIIA) is measured by the method described later in the section of EXAMPLES.

The copolymerized polycarbonate diol (IIIA) used as a raw material for producing a thermoplastic polyurethane resin elastomer of the present invention may be a single kind of a diol, or may be two or more kinds of diols differing from one another in, for example, repeating units, molar ratios thereof, or properties.

(Methods for Producing Copolymerized Polycarbonate Diols (IIIA))

The copolymerized polycarbonate diol (IIIA) may be produced by polymerizing: a C3-C5 dihydroxy compound for introducing repeating units (A), preferably a C3-C5 linear aliphatic dihydroxy compound, specifically, one, or two or more of 1,3-propanediol, 1,4-butanediol and 1,5-pentanediol, and preferably 1,4-butanediol; a C6-C20, preferably C8-C12 linear aliphatic dihydroxy compound for introducing repeating units (B), for example, one, or two or more of 1,8-octanediol, 1,9-nonanediol, 1,10-decanediol and the like; and a carbonate compound that is a carbonate ester, in accordance with a known process in the presence of a catalyst while ensuring that the raw material dihydroxy compounds are used so as to have a molar ratio (B)/(A) falling in the aforementioned preferred range.

The carbonate compound that is used in the production of the copolymerized polycarbonate diol (IIIA) is not limited as long as the advantageous effects of the present invention are not impaired. Examples thereof include dialkyl carbonates, diaryl carbonates and alkylene carbonates. A single or a plurality of these kinds of compounds may be used. From the point of view of reactivity, diaryl carbonates are preferable.

Specific examples of the carbonate compounds include dimethyl carbonate, diethyl carbonate, dibutyl carbonate, diphenyl carbonate and ethylene carbonate, with diphenyl carbonate being preferable.

In the production of the copolymerized polycarbonate diol (IIIA), a transesterification catalyst may be used as required in order to promote the polymerization.

Any compounds generally recognized as having transesterification ability may be used as the transesterification catalysts without limitation.

Examples of the transesterification catalysts include compounds of Group I metals (except hydrogen) in the long periodic table (hereinafter, simply written as the "periodic table") such as lithium, sodium, potassium, rubidium and cesium; compounds of Group II metals in the periodic table such as magnesium, calcium, strontium and barium; compounds of Group IV metals in the periodic table such as titanium and zirconium; compounds of Group V metals in the periodic table such as hafnium; compounds of Group IX metals in the periodic table such as cobalt; compounds of Group XII metals in the periodic table such as zinc; compounds of Group XIII metals in the periodic table such as aluminum; compounds of Group XIV metals in the periodic table such as germanium, tin and lead; compounds of Group XV metals in the periodic table such as antimony and bismuth; and compounds of lanthanoid metals such as lanthanum, cerium, europium and ytterbium. Among these, compounds of Group I metals in the periodic table (except hydrogen), compounds of Group II metals in the periodic table, compounds of Group IV metals in the periodic table, compounds of Group V metals in the periodic table, compounds of Group IX metals in the periodic table, compounds of Group XII metals in the periodic table, compounds of Group XIII metals in the periodic table, and compounds of Group XIV metals in the periodic table are preferable from the point of view of increasing the transesterification reaction rate. Compounds of Group I metals in the periodic table (except hydrogen) and compounds of Group II metals in the periodic table are more preferable, and compounds of Group II metals in the periodic table are still more preferable. Among the compounds of Group I metals in the periodic table (except hydrogen), compounds of lithium, potassium and sodium are preferable, compounds of lithium and sodium are more preferable, and compounds of sodium are still more preferable. Among the compounds of Group II metals in the periodic table, compounds of magnesium, calcium and barium are preferable, compounds of calcium and magnesium are more preferable, and compounds of magnesium are still more preferable. These metal compounds are mainly used as, for example, hydroxides or salts. Examples of the salts when the compounds are used as salts include halide salts such as chlorides, bromides and iodides; carboxylate salts such as acetate salts, formate salts and benzoate salts; inorganic acid salts such as carbonate salts and nitrate salts; sulfonate salts such as methanesulfonates, toluenesulfonates and trifluoromethanesulfonates; phosphorus-containing salts such as phosphate salts, hydrogen phosphate salts and dihydrogen phosphate salts; and acetylacetonate salts. The catalyst metals may also be used as alkoxides such as methoxide or ethoxide.

Among those described above, the transesterification catalyst that is used is preferably an acetate salt, a nitrate salt, a sulfate salt, a carbonate salt, a phosphate salt, a hydroxide, a halide or an alkoxide of at least one metal selected from Group II metals in the periodic table, more preferably an acetate salt, a carbonate salt or a hydroxide of a Group II metal in the periodic table, still more preferably an acetate salt, a carbonate salt or a hydroxide of magnesium or calcium, particularly preferably an acetate salt of magnesium or calcium, and most preferably magnesium acetate.

In the production of the copolymerized polycarbonate diol (IIIA), the carbonate compound may be used in any amount without limitation. Usually, the lower limit of the molar ratio relative to 1 mol of the total of the dihydroxy compounds is preferably 0.35, more preferably 0.50, and still more preferably 0.60, and the upper limit is preferably 1.00, more preferably 0.98, and still more preferably 0.97. If the amount of the carbonate compound used exceeds the above upper limit, the copolymerized polycarbonate diol (IIIA) that is obtained may have an increased proportion of components that are not terminated with a hydroxyl group or may have a molecular weight outside the predetermined range. If the amount of the carbonate compound used is below the above lower limit, the polymerization may not proceed to the predetermined molecular weight.

When the transesterification catalyst described above is used in the production of the copolymerized polycarbonate diol (IIIA), the amount thereof is preferably such that the performance is not adversely affected even if the catalyst remains in the polycarbonate diol that is obtained.

The amount in which the transesterification catalyst is used is such that the upper limit of the mass ratio of the metal to the mass of the raw material dihydroxy compounds is preferably 500 mass ppm, more preferably 100 mass ppm, still more preferably 50 mass ppm, and particularly preferably 10 mass ppm. On the other hand, the lower limit is preferably 0.01 mass ppm to ensure sufficient polymerization activity, and is more preferably 0.1 mass ppm, and still more preferably 1 mass ppm.

The reaction temperature in the transesterification reaction may be selected appropriately as long as a practical reaction rate can be obtained at the temperature. Usually, the lower limit of the reaction temperature is preferably 70° C., more preferably 100° C., and still more preferably 130° C. Usually, the upper limit of the reaction temperature is preferably 250° C., more preferably 230° C., and still more preferably 200° C. By controlling the reaction temperature to not more than the above upper limit, it is possible to prevent quality problems such as coloration or the formation of ether structures in the polycarbonate diol that is obtained.

The reaction temperature is preferably not more than 180° C., more preferably not more than 170° C., and still more preferably not more than 160° C. throughout the entire process of the transesterification reaction for producing the copolymerized polycarbonate diol (IIIA). By controlling the reaction temperature to not more than 180° C. throughout the entire process, it is possible to prevent easy occurrence of coloration under certain conditions.

The reaction may be carried out at atmospheric pressure. Since the transesterification reaction is an equilibrium reaction, the reaction may be biased toward producing more products by distilling off light boiling components that are generated out of the system. It is therefore usually preferable that reduced pressure conditions be adopted in the latter half of the reaction to perform the reaction while distilling off light boiling components. Alternatively, the reaction may be carried out in such a manner that the pressure is lowered gradually from some midpoint of the reaction so as to distill off light boiling components that are generated. Particularly preferably, the reaction is performed while increasing the degree of vacuum in the final stage of the reaction. In this manner, by-products such as monoalcohols, phenols and cyclic carbonates may be advantageously distilled off.

In the above case, the upper limit of the reaction pressure at the completion of the reaction is preferably 10 kPa, more preferably 5 kPa, and still more preferably 1 kPa.

To ensure that light boiling components will be distilled off effectively, the reaction may be carried out while flowing an inert gas such as nitrogen, argon or helium through the reaction system.

When the carbonate compound and/or the dihydroxy compounds used in the transesterification reaction are of low boiling point, an approach may be adopted in which the reaction is performed near the boiling point of the carbonate compound or the dihydroxy compounds at an early stage of the reaction, and the temperature is gradually raised as the reaction proceeds to a further stage. In this manner, it is possible to prevent the evaporation of the unreacted carbonate compound at an early stage of the reaction.

To prevent the evaporation of these raw materials, a reflux tube may be attached to the reactor and the reaction may be carried out while refluxing the carbonate compound and the dihydroxy compounds. In this case, the quantitative ratio of the reagents may be accurately controlled without loss of the raw materials charged.

The polymerization reaction may be carried out batchwise or continuously, and is preferably performed continuously for reasons such as product stability. Any type of an apparatus such as a tank, a tube or a tower may be used. For example, any of various known polymerization tanks equipped with a stirring blade may be used. The atmosphere in which the temperature in the apparatus is raised is not particularly limited, but is preferably an inert gas such as nitrogen gas at atmospheric pressure or a reduced pressure from the point of view of product quality.

The polymerization reaction is performed while measuring the molecular weight of the copolymerized polycarbonate diol (IIIA) produced and is terminated when the target molecular weight is reached. The reaction time required for the polymerization is not necessarily limited because it varies significantly depending on the types of the dihydroxy compounds and carbonate compound used, and the presence/absence and type of the catalyst used. Usually, the reaction time is preferably not more than 50 hours, more preferably not more than 20 hours, and still more preferably not more than 10 hours.

When the polymerization reaction involves a catalyst, the copolymerized polycarbonate diol (IIIA) that is obtained usually contains the residual catalyst. The residual catalyst sometimes inhibits control of the polyurethane-forming reaction. To eliminate the influence of the residual catalyst, it is preferable that a catalyst deactivator such as a phosphorus compound be added in a molar amount substantially equal to that of the transesterification catalyst to deactivate the transesterification catalyst used. The transesterification catalyst may be deactivated efficiently by performing treatment such as heat treatment as will be described later, after the addition of the catalyst deactivator.

Examples of the phosphorus compounds used to deactivate the transesterification catalysts include inorganic phosphoric acids such as phosphoric acid and phosphorous acid, and organic phosphoric acid esters such as dibutyl phosphate, tributyl phosphate, trioctyl phosphate, triphenyl phosphate and triphenyl phosphite. These may be used singly, or two or more may be used in combination.

The amount in which the phosphorus compound is used is not particularly limited and may be approximately equimolar to the amount of the transesterification catalyst used. Specifically, the upper limit of the amount in which the phosphorus compound is used is preferably 5 mol, and more preferably 2 mol, and the lower limit is preferably 0.8 mol, and more preferably 1.0 mol, per mol of the transesterification catalyst used. If the phosphorus compound is used in an amount below the lower limit, the transesterification catalyst in the reaction product is not sufficiently deactivated, and the copolymerized polycarbonate diol (IIIA) that is obtained may still have a high level of reactivity with respect to isocyanate groups when the copolymerized polycarbonate diol (IIIA) is used as a raw material for producing a thermoplastic polyurethane resin elastomer. If the phosphorus compound is used in an amount exceeding the above range, the copolymerized polycarbonate diol (IIIA) that is obtained may be colored.

The deactivation of the transesterification catalyst by the addition of the phosphorus compound may be performed even at room temperature but is more efficient when combined with heat treatment. While the temperature of this heat treatment is not particularly limited, the upper limit is preferably 180° C., more preferably 150° C., still more preferably 120° C., and particularly preferably 100° C., and the lower limit is preferably 50° C., more preferably 60° C., and still more preferably 70° C. If the temperature is below the lower limit, the deactivation of the transesterification catalyst takes time and is not efficient, and the degree of deactivation may be insufficient. At temperatures above 180° C., the copolymerized polycarbonate diol (IIIA) that is obtained may be colored.

The amount of time of the reaction with the phosphorus compound is not particularly limited, but is usually 1 to 5 hours.

From the point of view of controlling the polyurethane-forming reaction, the amount of the catalyst remaining in the copolymerized polycarbonate diol (IIIA) is preferably not more than 100 mass ppm, and particularly preferably not more than 10 mass ppm in terms of metal. To ensure a required amount of catalyst, the amount of the catalyst remaining in the copolymerized polycarbonate diol (IIIA) is preferably not less than 0.01 mass ppm, more preferably not less than 0.1 mass ppm, and particularly preferably not less than 5 mass ppm in terms of metal.

The reaction product may be purified for the purpose of removing undesired substances in the product such as impurities having no hydroxyl groups at the polymer ends, phenols, the raw material dihydroxy compounds and carbonate compound, light boiling cyclic carbonate by-products, and the catalyst added.

The reaction product may be purified of light boiling compounds by distillation. Specifically, the type of distillation is not particularly limited and may be, for example, vacuum distillation, steam distillation or thin-film distillation. While any type of distillation may be adopted, thin-film distillation is particularly effective.

While the thin-film distillation conditions are not particularly limited, the upper limit of the temperature during the thin-film distillation is preferably 250° C., and preferably 200° C., and the lower limit is preferably 120° C., and more preferably 150° C.

The above lower limit of the temperature during the thin-film distillation ensures that light boiling components will be removed sufficiently effectively. By limiting the upper limit of the temperature during the thin-film distillation to 250° C., it is possible to prevent the coloration of the copolymerized polycarbonate diol (IIIA) that is obtained after the thin-film distillation.

The upper limit of the pressure during the thin-film distillation is preferably 500 Pa, more preferably 150 Pa, still more preferably 70 Pa, and particularly preferably 60

Pa. This upper limit of the pressure during the thin-film distillation ensures that light boiling components will be removed sufficiently effectively.

The upper limit of the temperature at which the copolymerized polycarbonate diol (IIIA) is held immediately before the thin-film distillation is preferably 250° C., and more preferably 150° C., and the lower limit thereof is preferably 80° C., and more preferably 120° C.

By controlling the holding temperature for the copolymerized polycarbonate diol (IIIA) immediately before the thin-film distillation to not less than the above lower limit, it is possible to prevent the decrease in the fluidity of the copolymerized polycarbonate diol (IIIA) immediately before the thin-film distillation. The above upper limit of the holding temperature ensures that the copolymerized polycarbonate diol (IIIA) that is obtained after the thin-film distillation will not be colored.

To remove water-soluble impurities from the copolymerized polycarbonate diol (IIIA) that is produced, the copolymerized polycarbonate diol (IIIA) may be washed with, for example, water, alkaline water, acidic water or a solution of a chelating agent. In this case, the compound that is dissolved in water may be selected appropriately.

When, for example, a diaryl carbonate such as diphenyl carbonate is used as a raw material, phenols are by-produced during the production of the copolymerized polycarbonate diol (IIIA). Phenols are monofunctional compounds and thus may act as inhibitors in the production of a thermoplastic polyurethane resin elastomer. Further, urethane bonds formed by phenols have a weak bond strength and may be dissociated by heat applied during, for example, the subsequent steps, with the result that isocyanates and phenols may be regenerated and cause problems. Furthermore, phenols are irritants and therefore a smaller amount of phenols remaining in the copolymerized polycarbonate diol (IIIA) is more preferable. The residual amount of phenols in the copolymerized polycarbonate diol (IIIA), specifically, the mass ratio relative to the copolymerized polycarbonate diol (IIIA) is preferably not more than 1000 ppm, more preferably not more than 500 ppm, still more preferably not more than 300 ppm, and particularly preferably not more than 100 ppm. The amount of phenols in the copolymerized polycarbonate diol (IIIA) may be effectively reduced by, as described hereinabove, performing the polymerization reaction for the copolymerized polycarbonate diol (IIIA) in high vacuum at an absolute pressure of not more than 1 kPa, or subjecting the copolymerized polycarbonate diol (IIIA) to treatment such as thin-film distillation after the polymerization reaction.

The carbonate compound used as a raw material in the production may remain in the copolymerized polycarbonate diol (IIIA). While the residual amount of the carbonate compound in the copolymerized polycarbonate diol (IIIA) is not limited, a smaller amount is more preferable. The upper limit of the mass ratio thereof to the copolymerized polycarbonate diol (IIIA) is preferably 5 mass %, more preferably 3 mass %, and still more preferably 1 mass %. If the content of the carbonate compound in the copolymerized polycarbonate diol (IIIA) is too high, the polyurethane-forming reaction may be hindered. On the other hand, the lower limit thereof is not particularly limited but is preferably 0.1 mass %, more preferably 0.01 mass %, and still more preferably 0 mass %.

The dihydroxy compounds used in the production may remain in the copolymerized polycarbonate diol (IIIA). While the residual amount of the dihydroxy compounds in the copolymerized polycarbonate diol (IIIA) is not limited, a smaller amount is more preferable. The mass ratio thereof to the copolymerized polycarbonate diol (IIIA) is preferably not more than 1 mass %, more preferably not more than 0.1 mass %, and still more preferably not more than 0.05 mass %. If the residual amount of the dihydroxy compounds in the copolymerized polycarbonate diol (IIIA) is large, the molecular length of soft segment moieties in a thermoplastic polyurethane resin elastomer may be insufficient, and desired properties may not be obtained.

The copolymerized polycarbonate diol (IIIA) may contain a cyclic carbonate (a cyclic oligomer) that is by-produced during the production. When, for example, a 2,2-dialkyl-1,3-propanediol is used as the raw material dihydroxy compound for introducing the repeating units (B), the 5,5-dialkyl-1,3-dioxan-2-one or derivatives thereof such as cyclic carbonates formed of two or more molecules thereof may be generated and contained in the copolymerized polycarbonate diol (IIIA). More specifically, when 2,2-dimethyl-1,3-propanediol is used, 5,5-dimethyl-1,3-dioxan-2-one or derivatives thereof such as cyclic carbonates formed of two or more molecules thereof may be generated and contained in the copolymerized polycarbonate diol (IIIA). These compounds may cause side reactions in the polyurethane-forming reaction and may also cause turbidity. It is therefore preferable that as much as possible of such compounds be removed beforehand by, for example, performing the polymerization reaction for the copolymerized polycarbonate diol (IIIA) in high vacuum at an absolute pressure of not more than 1 kPa, or subjecting the copolymerized polycarbonate diol (IIIA) to thin-film distillation after the synthesis. While the content of cyclic carbonates such as 5,5-dialkyl-1,3-dioxan-3-one present in the copolymerized polycarbonate diol (IIIA) is not limited, the mass ratio thereof to the copolymerized polycarbonate diol (IIIA) is preferably not more than 3 mass %, more preferably not more than 1 mass %, and still more preferably not more than 0.5 mass %.

(Polyols Other than Copolymerized Polycarbonate Diols (IIIA))

In the polyurethane-forming reaction for producing a thermoplastic polyurethane resin elastomer of the present invention, the copolymerized polycarbonate diol (IIIA) may be used in combination with an additional polyol as required as long as properties are not adversely affected. Here, the additional polyol other than the copolymerized polycarbonate diol (IIIA) is not particularly limited as long as it is used in usual polyurethane production. Polyols may be used such as polyester polyols, polycaprolactone polyols, polyalkylene ether glycols, and polycarbonate polyols other than the copolymerized polycarbonate diols (IIIA).

Examples of the polyester polyols include those obtained by dehydration condensation of an aliphatic dibasic acid such as adipic acid or an aromatic dibasic acid such as phthalic anhydride, with an aliphatic glycol. Examples of the polyalkylene polyol ether glycols include poly(oxyethylene) glycols and poly(oxypropylene)glycols obtained by addition polymerization of ethylene oxide or propylene oxide, and polytetramethylene ether glycols (PTMG) obtained by ring-opening polymerization of tetrahydrofuran. Further, any known polyols such as polyolefin polyols may be used as the additional polyols.

Polyester polyols and polycaprolactone polyols are insufficient in durability such as hydrolysis resistance. Polyalkylene ether glycols do not have sufficient durability and are poor in weather resistance and chemical resistance. These may be added in an amount of not more than 20 mol % to the polyols (III) as long as properties are not adversely affected.

The additional polyols other than the copolymerized polycarbonate diols (IIIA) may be used singly, or two or more may be used in combination.

The polyol (III) used in the present invention has a number average molecular weight determined from the hydroxyl value of 300 to 10,000, preferably 500 to 5,000, and more preferably 800 to 3,000.

(Proportion of Copolymerized Polycarbonate Diol (IIIA) in Polyol(s) (III))

The proportion of the content of the copolymerized polycarbonate diol (IIIA) relative to the polyol or polyols (III) used in the production of a thermoplastic polyurethane resin elastomer of the present invention, that is, relative to the total of the copolymerized polycarbonate diol (IIIA) and any additional polyol other than the copolymerized polycarbonate diol (IIIA) is not less than 80 mol %, preferably not less than 90 mol %, more preferably not less than 95 mol %, and most preferably 98 to 100 mol %. If the proportion of the content of the copolymerized polycarbonate diol (IIIA) in the polyols (III) is low, the feature of the present invention may be lost, specifically, film articles and shaped articles using a thermoplastic polyurethane resin elastomer may fail to attain special mechanical properties, that is, may fail to show a small change in elastic modulus depending on temperature and to have a constant tensile strength, and at the same time may fail to have excellent durability properties such as weather resistance and chemical resistance, high transparency and good texture.

It is preferable to use a biomass polyol as an additional polyol. In this manner, the biobased carbon content of a thermoplastic polyurethane resin elastomer that is obtained is advantageously increased. For example, use may be made of biomass polytetramethylene ether glycol (PTMG) and polytrimethylene ether glycol, and polyester polyols obtained by reacting a diol with a biomass dicarboxylic acid such as biosuccinic acid, biosebacic acid or bioitaconic acid. From the point of view of the origin from non-edible plants, those that are obtained using biosebacic acid produced from castor oil are more preferable.

[Thermoplastic Polyurethane Resin Elastomers]

A thermoplastic polyurethane resin elastomer of the present invention is a thermoplastic polyurethane resin elastomer obtained by reacting an isocyanate compound (I), an aliphatic alcohol (II) having a number average molecular weight determined from the hydroxyl value of less than 300 and having only a hydroxyl group as a functional group, and a polyol (III) having a number average molecular weight determined from the hydroxyl value of not less than 300 and not more than 10,000. The isocyanate compound (I) comprises not less than 90 mol % in total of an aliphatic isocyanate compound containing two isocyanate groups and/or an alicyclic isocyanate compound containing two isocyanate groups. The aliphatic alcohol (II) comprises not less than 90 mol % of a C12 or lower aliphatic diol. The polyol (III) comprises not less than 80 mol % of a copolymerized polycarbonate diol (IIIA) including a repeating unit (A) and a repeating unit (B) represented by the formula (B). In the thermoplastic polyurethane resin elastomer, the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0-5.5:1.0-4.5 (with the proviso that 0.95≤(EI)/((EII)+(EIII))≤1.05). The number average molecular weight determined from the hydroxyl value of the copolymerized polycarbonate diol (IIIA) is not less than 500 and not more than 5,000.

In the thermoplastic polyurethane resin elastomer of the present invention, the equivalent ratio of the hydroxyl equivalent (EIII) of the polyol (III), the isocyanate equivalent (EI) of the isocyanate compound (I) and the hydroxyl equivalent (EII) of the aliphatic alcohol (II) is 0.95≤(EI)/((EII)+(EIII)):1.05.

The hydroxyl equivalent is the chemical formula weight per hydroxyl group in the polyol or the aliphatic alcohol.

The isocyanate equivalent is the chemical formula weight per isocyanate group in the isocyanate compound.

If the value of (EI)/((EII)+(EIII)) is less than 0.95, the thermoplastic polyurethane resin elastomer has insufficient properties such as chemical resistance and heat resistance. If the value of (EI)/((EII)+(EIII)) exceeds 1.05, the thermoplastic polyurethane resin elastomer is partially crosslinked and has an increased proportion of unreacted isocyanate groups being converted to amino groups by the reaction with water in the air or the water tank, and consequently may suffer deterioration in shaping properties, may form a large number of fisheyes stemming from gelation, may be yellowed easily, and may exhibit insufficient mechanical strength such as elongation. The lower limit of (EI)/((EII)+(EIII)) is preferably not less than 0.97, and more preferably not less than 0.99. The upper limit of (EI)/((EII)+(EIII)) is preferably not more than 1.04, and more preferably not more than 1.03.

The value of (EI)/((EII)+(EIII)) in the thermoplastic polyurethane resin elastomer of the present invention may be determined from the mass ratio of the components at the time of polymerization or may be measured with an NMR (nuclear magnetic resonance spectrum) device usually at 400 MHz or above.

In the thermoplastic polyurethane resin elastomer of the present invention, the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0~5.5:1.0~4.5 while still satisfying the above value. That is, when the hydroxyl equivalent (EIII) of the polyol (III) is 1, the ratio represented by isocyanate equivalent (EI) of isocyanate compound (I)/hydroxyl equivalent (EII) of aliphatic alcohol (II) is 2/1, 3/2, 4/3, 5/4 or 5.5/1 when shown as an integer ratio, and includes an equivalent ratio between these ratios.

If the isocyanate equivalent (EI) of the isocyanate compound (I) is less than 2.0 relative to the hydroxyl equivalent (EIII) of the polyol (III) being 1, the thermoplastic polyurethane resin elastomer has insufficient mechanical strength and low breaking strength, or exhibits low elastic characteristics or insufficient heat resistance. If the isocyanate equivalent (EI) of the isocyanate compound (I) exceeds 5.5, the thermoplastic polyurethane resin elastomer shows a large change in elastic modulus at different temperatures, has low breaking elongation, has an excessively high elastic modulus to show low elastic characteristics, and also exhibits insufficient flexibility at low temperatures.

When the hydroxyl equivalent (EIII) of the polyol (III) is 1, the isocyanate equivalent (EI) of the isocyanate compound (I) is preferably 2.5 to 5.0, and more preferably 2.5 to 4.5 from the point of view of the balance between various properties and various durability properties.

The thermoplastic polyurethane resin elastomer exhibits insufficient strength if the hydroxyl equivalent (EII) of the aliphatic alcohol (II) is less than 1.0 relative to the hydroxyl equivalent (EIII) of the polyol (III) being 1, and has insufficient flexibility if the hydroxyl equivalent of the aliphatic alcohol exceeds 4.5.

When the hydroxyl equivalent (EIII) of the polyol (III) is 1, the hydroxyl equivalent (EII) of the aliphatic alcohol (II) is preferably 1.5 to 4.0, and more preferably 1.5 to 4.0 from the point of view of the balance between strength and flexibility.

The equivalent ratio of (EI), (EII) and (EIII) in the thermoplastic polyurethane resin elastomer may be determined by measurement with an NMR (nuclear magnetic resonance spectrum) device usually at 400 MHz or above.

In the thermoplastic polyurethane resin elastomer of the present invention, the content of a biomass resource is preferably not less than 10 mass % of the thermoplastic polyurethane resin elastomer.

If the biomass resource content is less than 10%, the elastomer does not effectively contribute to global warming control to a sufficient extent and thus cannot be said to be sufficiently friendly to the global environment. The value is preferably not less than 20 mass %, more preferably not less than 30 mass %, and most preferably not less than 50 mass %, and is usually 95 mass % or less.

The biomass resources as used in the present invention are, for example, starch, sugars, celluloses and other forms of storage that are converted from solar light energy by the photosynthetic action of plants, bodies of animals that feed on plants, and products that are made by processing plants or animals.

Among those described above, plant resources are more preferred biomass resources. Examples of the plant resources include wood, rice straw, rice husk, rice bran, old rice, corn, sugar cane, cassava, sago palm, soy pulp, corncob, tapioca residue, bagasse, vegetable oil residue, potato, buckwheat, soybean, oil, fat, waste paper, papermaking residue, marine product residue, livestock excrement, sewage sludge and food waste.

Among those described above, such plant resources as wood, rice straw, rice husk, rice bran, old rice, corn, sugar cane, cassava, sago palm, soy pulp, corncob, tapioca residue, bagasse, vegetable oil residue, potato, buckwheat, soybean, oil, fat, waste paper and papermaking residue are preferable. Wood, rice straw, rice husk, old rice, corn, sugar cane, cassava, sago palm, potato, oil, fat, waste paper and papermaking residue are more preferable. Corn, sugar cane, cassava and sago palm are most preferable.

For example, these biomass resources are guided to carbon sources through steps including, although not particularly limited to, known pretreatments such as chemical treatment with acids, alkalis or the like, biological treatment using microorganisms and physical treatment, and also a saccharification step.

For example, the steps described above usually include, although not particularly limited to, a step of reducing the size of the biomass resources by such pretreatment as chipping, shaving or crushing. Where necessary, the steps further include a step of pulverizing the biomass resources with a grinder or a mill.

The biomass resources thus reduced in size are further subjected to pretreatment and saccharification steps, and are thus guided to carbon sources. Specific examples of the methods used herein include chemical methods such as acid treatment with a strong acid such as sulfuric acid, nitric acid, hydrochloric acid or phosphoric acid, alkali treatment, ammonia freeze explosion, solvent extraction, supercritical fluid treatment and oxidant treatment, physical methods such as micro pulverization, steam explosion, microwave treatment and electron beam irradiation, and biological treatments such as hydrolysis by microbial or enzymatic treatment.

Examples of the carbon sources derived from the biomass resources include fermentable carbohydrates such as hexoses including glucose, mannose, galactose, fructose, sorbose and tagatose, pentoses including arabinose, xylose, ribose, xylulose and ribulose, disaccharides and polysaccharides including pentosan, saccharose, starch and cellulose, fatty acids including butyric acid, caproic acid, caprylic acid, capric acid, lauric acid, myristic acid, palmitic acid, palmitoleic acid, stearic acid, oleic acid, linoleic acid, linolenic acid, monocutinic acid, arachidic acid, eicosenoic acid, arachidonic acid, behenic acid, erucic acid, docosapentaenoic acid, docosahexaenoic acid, lignoceric acid and ceracoreic acid, and polyalcohols including glycerin, mannitol, xylitol and ribitol. Among these, glucose, maltose, fructose, sucrose, lactose, trehalose and cellulose are preferable.

Among numerous kinds of biomass resources, the biomass resources used in the thermoplastic polyurethane resin elastomer are most preferably those produced from non-edible plants for the reasons that such biomass resources do not conflict with human food problems and are also desirable from the viewpoint of animal protection. The content of non-edible plant origin in the raw material diols for the raw material polyol used in the thermoplastic polyurethane resin elastomer is preferably not less than 10 mass %. Examples of the non-edible plant biomass resources include non-edible grass and trees, oil palm pomace and empty fruit bunches, castor oil plant, corn core and foliage, bagasse, soybean and rapeseed pomace and empty pods, food processing residues, and extracts from these biomasses (such as vegetable fats and oils including castor oil, cellulose and glucose). Examples of the diols produced from non-edible plants include 1,10-decanediol from castor oil, and 1,3-propanediol and 1,4-butanediol from, for example, corn core and foliage. Corn requires a large amount of water to grow. To avoid conflict with the recent water shortage problem of human beings, non-edible corn biomass resources are less preferable than castor oil biomass resources obtained from castor oil plant that requires only a small amount of water to grow.

If the content of non-edible plant origin in the raw material diols for the raw material polyol used in the thermoplastic polyurethane resin elastomer is less than 10 mass %, the elastomer does not effectively contribute to global warming control to a sufficient extent. The proportion is more preferably not less than 30 mass %, and most preferably not less than 50 mass %, and is usually 95 mass % or less.

To obtain a thermoplastic polyurethane elastomer resin of the present invention having a biomass resource content of not less than 10 mass %, a biomass component may be used in any of the polyol (III), the isocyanate compound (I) and the aliphatic alcohol (II). It is preferable to use a biomass component in the raw material diols for the polyol (III) because the polyol (III) represents the largest proportion in the mass compositional ratio in the thermoplastic polyurethane resin elastomer of the present invention and thus the biomass resource content can be efficiently increased.

The biomass resource in the raw material diols for the polyol (III) is preferably of non-edible plant origin and the content thereof is preferably not less than 10 mass %, preferably not less than 20 mass %, still more preferably not less than 30 mass %, and most preferably not less than 50 mass %.

For example, the content of plant biomass resources in the raw materials for producing the thermoplastic polyurethane resin elastomer may be increased by:

1) using biomass 1,5-pentamethylene diisocyanate as the isocyanate compound (I), 2) using biomass ethylene glycol, 1,3-propanediol, 1,4-butanediol or 1,10-decanediol as the aliphatic alcohol (II), or 3) using biomass ethylene glycol, 1,3-propanediol, 1,4-butanediol or 1,10-decanediol as a comonomer for the copolymerized polycarbonate diol (IIIA).

To ensure that the thermoplastic polyurethane resin elastomer of the present invention will give non-yellowing thermoplastic polyurethane films and other shaped articles which have special mechanical properties, specifically, show a small change in elastic modulus depending on temperature and have a constant tensile strength, and which at the same time have excellent durability properties such as weather resistance and chemical resistance, high transparency and good texture, it is particularly preferable to use 1,10-decanediol produced from castor oil of non-edible plant origin.

As already described hereinabove, the polyol (III) may be a combination of the copolymerized polycarbonate diol (IIIA) and an additional polyol. This additional polyol is advantageously of biomass origin for the reason that the biobased carbon content of the thermoplastic polyurethane resin elastomer is increased. However, biomass polytetramethylene ether glycol (PTMG) or polytrimethylene ether glycol used in an increased amount deteriorates the durability such as chemical resistance and yellowing resistance of the thermoplastic polyurethane resin elastomer that is obtained. Further, for example, the use of a polyester polyol obtained by reacting a biomass dicarboxylic acid such as biosuccinic acid, biosebacic acid or bioitaconic acid with a diol deteriorates the durability such as hydrolysis resistance of the thermoplastic polyurethane resin elastomer that is obtained. Thus, these biomass polyols should be used in a limited range.

To increase the biobased carbon content of the thermoplastic polyurethane resin elastomer, it is preferable in the present invention that the diols used as the raw materials for the polyol (III), particularly the copolymerized polycarbonate diol (IIIA), include not less than 10 mol % of a biomass diol of non-edible plant origin. 1,10-Decanediol is a particularly preferred biomass diol of non-edible plant origin. When used as the chain extender, this diol tends to give rise to a decrease in mechanical properties of the thermoplastic polyurethane resin elastomer that is obtained. Thus, 1,10-decanediol is preferably used as a constituent component for the copolymerized polycarbonate diol (IIIA). The content of biomass diols of non-edible plant origin in the raw material diols for the polyol (III), particularly the copolymerized polycarbonate diol (IIIA), is more preferably not less than 20 mol %, still more preferably not less than 30 mol %, and most preferably not less than 50 mol %, and the upper limit thereof is preferably 95 mol % or less.

The molecular weight of the thermoplastic polyurethane resin elastomer of the present invention is not particularly limited and may be controlled appropriately in accordance with the use application of the thermoplastic polyurethane resin elastomer of the present invention that is produced. The polystyrene-equivalent weight average molecular weight (Mw) measured by gel permeation chromatography (GPC) is preferably 50,000 to 500,000, and more preferably 100,000 to 300,000. If the weight average molecular weight (Mw) is below the above lower limit, sufficient strength, hardness and durability cannot be obtained in some cases. Above the upper limit, handleability such as shaping properties and workability tend to be impaired.

The molecular weight distribution (Mw/Mn) of the thermoplastic polyurethane resin elastomer of the present invention is preferably 1.5 to 3.5, more preferably 1.7 to 3.0, and most preferably 1.8 to 2.5. If the molecular weight distribution is higher than 3.5, shaping properties are insufficient. Controlling the molecular weight distribution to below 1.5 requires a special purification treatment and is economically disadvantageous. The molecular weight distribution may be measured by GPC.

In the thermoplastic polyurethane resin elastomer of the present invention, the elastic modulus at 100% elongation measured by a tensile test at room temperature is preferably 1 MPa to 20 MPa, and more preferably 2 MPa to 15 MPa. When the elastomer will be used in such applications as films and sheets, the elastic modulus is particularly preferably 3 MPa to 10 MPa. If the elastic modulus at 100% elongation is less than 1 MPa, mechanical strength is insufficient and breaking strength is low. If the elastic modulus at 100% elongation is more than 15 MPa, mechanical strength is insufficient, breaking elongation is small, and elastic characteristics are low. The elastic modulus at 100 g elongation may be measured by a tensile test in accordance with JIS K6301 (2010).

In the thermoplastic polyurethane resin elastomer of the present invention, the durometer hardness is preferably Shore A70 to Shore D80, and more preferably Shore A75 to Shore D65. For such applications as films and sheets, Shore A80 to Shore D65 are particularly preferable. When flexibility is strongly required, Shore A80 to Shore A95 are particularly preferable. If the hardness is below Shore A70, the elastomer may not be cut well, may tend to fuse during drying, and may show poor mold releasability during molding. If the hardness exceeds Shore D80, elastic characteristics are insufficient. The Shore hardness may be measured with a hardness meter.

In the thermoplastic polyurethane resin elastomer of the present invention, the melt viscosity is important for film and sheet applications. The melt mass flow rate (MFR) is preferably 0.05 to 150 g/10 min, and more preferably 0.1 to 100 g/10 min as measured with a melt mass flow rate measuring device (device name: Melt Indexer, manufactured by TATEYAMA KAGAKU CO., LTD.) under a load of 2.16 kg at a usual shaping temperature of 150° C. to 220° C. in accordance with JIS 7210 (ISO 1133). If the melt viscosity is lower than 0.05 g/10 min, the elastomer is poorly flowable and requires an elevated shaping temperature. If the melt viscosity is higher than 150 g/10 min, the elastomer is excessively flowable and the shaping temperature needs to be lowered. Further, if the melt viscosity changes widely during the shaping process due to the heat resistance of the resin, it is difficult to form a film or a sheet with a uniform thickness.

The yellow index (YI) of the thermoplastic polyurethane resin elastomer of the present invention is preferably not more than 10, more preferably not more than 5, and most preferably not more than 3. If the yellow index (YI) is higher than 10, films or sheets disadvantageously look yellow even when the thickness is small. The YI may be measured by the method described in JIS K7373.

The transparency of products such as shaped articles using the thermoplastic polyurethane resin elastomer of the present invention may be usually measured with a haze meter or by a visual test. Shaped articles using the thermoplastic polyurethane resin elastomer of the present invention have excellent transparency.

When the thermoplastic polyurethane resin elastomer of the present invention is formed into a strip specimen in accordance with JIS K6301 (2010) having a width of 10 mm, a length of 100 mm and a thickness of about 50 m, and when the specimen is tensile tested on a tensile tester (product name: "Tensilon UTM-III-100", manufactured by Orientec Co., Ltd.) from a chuck distance of 50 mm at a stress rate of 500 mm/min, temperatures of 23° C. and 40° C. and a relative humidity of 55% to determine the stress at 100% elongation (100% modulus), the strength ratio in percentage of the 100% modulus measured at 40° C. to the 100% modulus measured at 23° C. (hereinafter, sometimes written as "40° C. (100% M)/23° C. (100% M)") is preferably not less than 70%; in addition, the thermoplastic polyurethane resin elastomer is preferably chemical resistant, and preferably has oleic acid resistance and shows a mass change of not more than 40% as measured by the following method. The concurrent satisfaction of these properties is particularly advantageous in use applications described later.

<Oleic Acid Resistance>

A 3 cm×3 cm specimen is cut out from a film of the thermoplastic polyurethane resin elastomer. The mass of the specimen is measured with a precision balance. The specimen is then added to a 250 ml volume glass bottle containing 50 ml of oleic acid as a test solvent, and is allowed to stand in a nitrogen atmosphere in a thermostatic chamber at 80° C. for 16 hours. After the test, the specimen is taken out, the front and back sides are lightly wiped with a paper wiper, and the mass is measured with the precision balance to calculate the mass change (the rate of increase) from the mass before the test.

If 40° C. (100% M)/23° C. (100% M) is less than 70%, the tensile strength differs greatly at these temperatures and varied mechanical properties are disadvantageously exhibited depending on the temperature, and further the elastic recovery tends to be deteriorated. When, in particular, the thermoplastic polyurethane resin elastomer is used as films, elastic fibers or the like for clothing applications, the variation in tensile strength at 40° C. that is close to body temperature adversely affects the comfort and texture. 40° C. (100% M)/23° C. (100% M) is more preferably not less than 75%.

The mass change in the evaluation of olefin acid resistance indicates the durability against oleic acid that is a component of human sweat, and is particularly important in applications described later in which products are brought into direct contact with the human body, such as films and sheets for clothing, elastic fibers for clothing, synthetic leather sheets for automobile interior materials, and decorative films. If this value exceeds 40%, the thermoplastic polyurethane resin elastomer is decomposed and exhibits bad mechanical properties in these applications, or is yellowed and becomes unusable. The mass change is more preferably not more than 35%, and most preferably not more than 30%.

In addition to the properties described above, it is important that the appearance (transparency) of a shaped article obtained from the thermoplastic polyurethane resin elastomer of the present invention be rated as 1, that is, have high transparency in the test method described later. If the transparency rating is 2 or 3, that is, if the transparency is not high, the elastomer has limited applications, and tends to change mechanical strength with time and is thus difficult to handle.

Although the thermoplastic polyurethane resin elastomer of the present invention includes a copolymerized polycarbonate diol, this polyol has appropriate crystallinity close to that of a homopolycarbonate. As a result of this, the elastomer can give shaped articles having 40° C. (100% M)/23° C. (100% M) of not less than 70% and a mass change in contact with oleic acid of not more than 40%, and also having excellent transparency at the same time.

[Methods for Producing Thermoplastic Polyurethane Resin Elastomers]

The thermoplastic polyurethane resin elastomer of the present invention may be produced by usual polyurethane-forming reaction generally used in experiments or in industry, except that the isocyanate compound (I), the aliphatic alcohol (II) having only a hydroxyl group as a functional group and the polyol (III) comprising the copolymerized polycarbonate diol (IIIA) in the predetermined ratio described hereinabove.

Here, the use of a solvent in the production of the thermoplastic polyurethane resin elastomer of the present invention is not advantageous in industry because the shaping process requires a step for removing the solvent. Further, solvents have high environmental impacts. It is therefore preferable that the reaction be performed without a solvent (in the absence of a solvent).

For example, the thermoplastic polyurethane resin elastomer of the present invention may be produced efficiently by reacting the copolymerized polycarbonate diol (IIIA), the isocyanate compound (I) and the chain extender (II) continuously in one shot in the range of 150° C. to 210° C. (one-step method).

Alternatively, the thermoplastic polyurethane resin elastomer of the present invention may be produced by first reacting the copolymerized polycarbonate diol (IIIA) with an excess of the isocyanate compound (I) to form a prepolymer having an isocyanate group at a terminal, and further reacting the prepolymer with the chain extender (II) to increase the degree of polymerization (two-step method).

In an exemplary preferred method for producing the thermoplastic polyurethane resin elastomer without a solvent, the isocyanate compound (I), the aliphatic alcohol (II) having a number average molecular weight determined from the hydroxyl value of less than 300 and having only a hydroxyl group as a functional group, and the polyol (III) having a number average molecular weight determined from the hydroxyl value of not less than 300 and not more than 10,000 are mixed with one another sufficiently by rapid stirring without a solvent, and the mixture is supplied to a device in which the mixture is continuously mixed, reacted and extruded, thereby producing the thermoplastic polyurethane resin elastomer continuously.

<Chain Terminators>

In the production of the thermoplastic polyurethane resin elastomer of the present invention, a chain terminator having one active hydrogen group may be added in a small amount as required for the purpose of controlling the molecular weight of the thermoplastic polyurethane resin elastomer that is obtained.

Examples of the chain terminators include aliphatic monools having one hydroxyl group, such as methanol, ethanol, propanol, butanol and hexanol.

These may be used singly, or two or more may be used in combination.

<Catalysts>

In the production of the thermoplastic polyurethane resin elastomer of the present invention, a catalyst may be used for the urethane-forming reaction. Examples of the urethane-forming reaction catalysts include organic tin compounds, organic zinc compounds, organic bismuth compounds, organic titanium compounds, organic zirconium compounds and amine compounds. The urethane-forming reaction catalysts may be used singly, or two or more may be used in combination.

When the urethane-forming reaction catalyst is used, it is recommended that the concentration thereof be controlled to 0.1 to 100 mass ppm relative to the mass of the thermoplastic polyurethane resin elastomer. By using 0.1 or more mass ppm of the urethane-forming reaction catalyst, the thermoplastic polyurethane resin elastomer maintains the initial molecular weight at a sufficiently high level even after being shaped, and tends to exhibit the inherent properties of the thermoplastic polyurethane resin elastomer effectively even in the form of a shaped article.

Among the urethane-forming reaction catalysts, organic tin compounds are preferable. Examples of the organic tin compounds include tin-containing acylate compounds and tin-containing mercaptocarboxylate salts. Specific examples thereof include tin octylate, monomethyltin mercaptoacetate salt, monobutyltin triacetate, monobutyltin monooctylate, monobutyltin monoacetate, monobutyltin maleate salt, monobutyltin maleic acid benzyl ester salt, monooctyltin maleate salt, monooctyltin thiodipropionate salt, monooctyltin tris(isooctylthioglycolic acid ester), monophenyltin triacetate, dimethyltin maleic acid ester salt, dimethyltin bis(ethylene glycol monothioglycolate), dimethyltin bis (mercaptoacetic acid) salt, dimethyltin bis(3-mercaptopropionic acid) salt, dimethyltin bis(isooctyl mercaptoacetate), dibutyltin diacetate, dibutyltin dioctoate, dibutyltin distearate, dibutyltin dilaurate, dibutyltin maleate salt, dibutyltin maleate salt polymer, dibutyltin maleic acid ester salt, dibutyltin bis(mercaptoacetic acid), dibutyltin bis(mercaptoacetic acid alkyl ester) salt, dibutyltin bis(3-mercaptopropionic acid alkoxybutyl ester) salt, dibutyltin bisoctylthioglycol ester salt, dibutyltin (3-mercaptopropionic acid) salt, dioctyltin maleate salt, dioctyltin maleic acid ester salt, dioctyltin maleate salt polymer, dioctyltin dilaurate, dioctyltin bis(isooctyl mercaptoacetate), dioctyltin bis(isooctylthioglycolic acid ester), and dioctyltin bis(3-mercaptopropionic acid) salt.

The isocyanate compound (I) used as a raw material in the present invention comprises an aliphatic isocyanate compound and/or an alicyclic isocyanate compound. These compounds are lower in reactivity than aromatic isocyanate compounds, and thus the use of a tin catalyst or the like is preferable. The use of a catalyst is more preferable when 4,4'-dicyclohexylmethane diisocyanate having particularly low reactivity is used.

When 4,4'-dicyclohexylmethane diisocyanate having particularly low reactivity is used, the onset of curing after polymerization is slow even when a catalyst is used. It is therefore preferable that the elastomer be aged at a temperature of 20° C. to 120° C. for 10 or more hours. If not aged sufficiently, the thermoplastic polyurethane resin elastomer may not attain a sufficiently high degree of polymerization and properties may be deteriorated.

<One-Step Methods>

A known one-step method described in literature such as JP-2004-182980A may be adopted for industrial production. For example, the thermoplastic polyurethane resin elastomer may be produced by continuously supplying the polyol (III) comprising the copolymerized polycarbonate diol (IIIA), the chain extender (II), the isocyanate compound (I) and optionally other components as required simultaneously or substantially simultaneously to a single-screw or multi-screw extruder or a static mixer, and continuously melt-polymerizing the mixture at 150 to 220° C., preferably 160 to 210° C.

In the production of the thermoplastic polyurethane resin elastomer of the present invention, the isocyanate compound (I), the chain extender (II) and the polyol (III) may be mixed with one another sufficiently by rapid stirring without a solvent, and the mixture may be supplied continuously to a single-screw or multi-screw extruder or a static mixer to produce a thermoplastic polyurethane resin elastomer continuously. This production method is effective when an aliphatic isocyanate compound and/or an alicyclic isocyanate compound having low reactivity is used. The isocyanate compound (I), the chain extender (II) and the copolymerized polycarbonate diol (IIIA) are not compatible well with one another and, particularly when the reactivity is slow, the components tend to separate before the reaction proceeds, possibly failing to produce a uniform thermoplastic polyurethane resin elastomer. Thus, it is preferable to forcibly mix the components beforehand with a rapid stirrer.

<Two-Step Methods>

The two-step method is also called a prepolymer process and is mainly performed by the following procedures.

The polyol (III) comprising the copolymerized polycarbonate diol (IIIA) and an excess of the isocyanate compound (I) are reacted in an isocyanate compound (I)/polyol (III) reaction equivalent ratio of more than 1 and not more than 10.0 to produce a prepolymer having an isocyanate group at a terminal of the molecular chain, and the chain extender (II) is added to the prepolymer to produce a thermoplastic polyurethane resin elastomer.

The two-step method may be performed without a solvent or in the presence of a solvent.

The production of the thermoplastic polyurethane resin elastomer by the two-step method may be carried out by any of the processes (1) to (3) described below.

(1) Without using a solvent, the isocyanate compound (I) and the polyol (III) comprising the copolymerized polycarbonate diol (IIIA) are reacted first directly with one another to synthesize a prepolymer. The prepolymer is then used directly for the chain-extending reaction.

(2) A prepolymer is synthesized by the process (1) and is then dissolved into a solvent and used for the subsequent chain-extending reaction.

(3) The isocyanate compound (I) and the polyol (III) comprising the copolymerized polycarbonate diol (IIIA) are reacted with one another in a solvent, and thereafter the chain-extending reaction is performed.

In the chain-extending reaction in the process (1), it is important that the thermoplastic polyurethane resin elastomer be obtained as a mixture with a solvent by, for example, dissolving the chain extender (II) into a solvent, or dissolving the prepolymer and the chain extender (II) into a solvent at the same time.

Among the production processes described above, melt polymerization substantially in the absence of a solvent is preferable when the target product is a thermoplastic polyurethane resin elastomer having excellent melt-forming properties and mechanical characteristics, and a continuous melt polymerization process using a multi-screw extruder is more preferable. A thermoplastic polyurethane resin elastomer obtained by a continuous melt polymerization process is generally excellent in strength compared to thermoplastic polyurethane resin elastomers obtained by solid-phase polymerization at 80 to 130° C. Further, the one-step method is advantageous in that the target thermoplastic polyurethane resin elastomer can be continuously produced very easily by simply supplying all the reaction components to the extruder simultaneously or substantially simultaneously.

Where necessary, additives such as a catalyst and a stabilizer may be added in the production of the thermoplastic polyurethane resin elastomer. For example, commercially available triphenyl phosphite (TPP) or the like may be added as an approach to enhancing the stability of the isocyanate compound (I) and stabilizing the production.

<Reaction Molar Ratios>

In any of the production methods described above, the urethane-forming reaction for producing the thermoplastic polyurethane resin elastomer of the present invention is performed while ensuring that the equivalent ratio will be $0.95 \leq (EI)/((EII)+(EIII)) \leq 1.05$ wherein (EIII) is the hydroxyl equivalent of the polyol (III) comprising the copolymerized polycarbonate diol (IIIA), (EI) is the isocyanate equivalent of the isocyanate compound (I) comprising an aliphatic isocyanate compound and/or an alicyclic isocyanate compound, and (EII) is the hydroxyl equivalent of the chain extender (II).

As already mentioned, if the value of this equivalent ratio is less than 0.95, the thermoplastic polyurethane resin elastomer that is obtained has insufficient properties such as chemical resistance and heat resistance. If this equivalent ratio exceeds 1.05, the thermoplastic polyurethane resin elastomer that is obtained is partially crosslinked and has an increased proportion of unreacted isocyanate groups being converted to amino groups by the reaction with water in the air or the water tank, and consequently may suffer deterioration in shaping properties, may form a large number of fisheyes stemming from gelation, may be yellowed easily, and may exhibit insufficient mechanical strength such as elongation. The lower limit of the equivalent ratio is preferably not less than 0.97, and more preferably not less than 0.99. The upper limit of the equivalent ratio is preferably not more than 1.04, and more preferably not more than 1.03.

In any of the production methods described above, the urethane-forming reaction for producing the thermoplastic polyurethane resin elastomer of the present invention is preferably performed while ensuring that the polyol (III) comprising the copolymerized polycarbonate diol (IIIA), the isocyanate compound (I) comprising an aliphatic isocyanate compound and/or an alicyclic isocyanate compound, and the chain extender (II) are reacted in an equivalent ratio represented by hydroxyl equivalent (EIII) of polyol (III):isocyanate equivalent (EI) of isocyanate compound (I):hydroxyl equivalent (EII) of aliphatic alcohol (II) of 1.0:2.0~5.5:1.0~4.5.

If the isocyanate equivalent (EI) of the isocyanate compound (I) is less than 2.0 relative to the hydroxyl equivalent (EIII) of the polyol (III) being 1, the thermoplastic polyurethane resin elastomer has insufficient mechanical strength and low breaking strength, or exhibits low elastic characteristics or insufficient heat resistance. If the isocyanate equivalent (EI) of the isocyanate compound (I) exceeds 5.5, the thermoplastic polyurethane resin elastomer shows a large change in elastic modulus at different temperatures, has low breaking elongation, has an excessively high elastic modulus to show low elastic characteristics, and also exhibits insufficient flexibility at low temperatures.

When the hydroxyl equivalent (EIII) of the polyol (III) is 1, the isocyanate equivalent (EI) of the isocyanate compound (I) is preferably 2.5 to 5.0, and more preferably 2.5 to 4.5 from the point of view of the balance between various properties and various durability properties.

The thermoplastic polyurethane resin elastomer exhibits insufficient strength if the hydroxyl equivalent (EII) of the aliphatic alcohol (II) is less than 1.0 relative to the hydroxyl equivalent (EIII) of the polyol (III) being 1, and has insufficient flexibility if the hydroxyl equivalent of the aliphatic alcohol exceeds 4.5.

When the hydroxyl equivalent (EIII) of the polyol (III) is 1, the hydroxyl equivalent (EII) of the aliphatic alcohol (II) is preferably 1.5 to 4.0, and more preferably 1.5 to 4.0 from the point of view of the balance between strength and flexibility.

[Additives]

The thermoplastic polyurethane resin elastomer of the present invention may form a composition by being compounded with one, or two or more additives selected from the group consisting of stabilizers including hindered phenolic antioxidants, UV absorbers and light stabilizers (HALS), and lubricants. Such a composition advantageously attains enhanced resin stability. Depending on use applications, other additives such as internal mold release agents, external mold release agents, fillers, plasticizers, colorants (dyes, pigments), flame retardants, crosslinking agents, reaction accelerators and reinforcing agents may be added and mixed with the elastomer to form a thermoplastic polyurethane resin elastomer composition as long as the characteristics of the thermoplastic polyurethane resin elastomer of the present invention are not impaired.

Examples of the internal mold release agents include fatty acid amides, fatty acid esters, fatty acids, fatty acid salts and silicone oils. Examples of the fatty acid amides include capramide, lauramide, myristamide, stearamide, oleamide, ethylenebisstearamide and ethylenebisoleamide. Examples of the fatty acid esters include esters of a long-chain fatty acid and an alcohol, with specific examples including sorbitan monolaurate, butyl stearate, butyl laurate, octyl palmitate and stearyl stearate. Examples of the fatty acids include capric acid, lauric acid, myristic acid, palmitic acid, stearic acid, montanic acid, lindenic acid, oleic acid, erucic acid and linoleic acid. Examples of the fatty acid salts include salts of the above fatty acids with metals (such as, for example, barium, zinc, magnesium and calcium).

Examples of the fillers include talc, calcium carbonate, chalk, calcium sulfate, clay, kaolin, silica, glass, fumed silica, mica, wollastonite, feldspar, aluminum silicate, calcium silicate, alumina, alumina hydrates such as alumina trihydrate, glass microspheres, ceramic microspheres, thermoplastic resin microspheres, barite, wood powder, glass fibers, carbon fibers, marble dust, cement dust, magnesium oxide, magnesium hydroxide, antimony oxide, zinc oxide, barium sulfate, titanium dioxide, titanate salts, and combinations thereof. Preferred fillers are talc, calcium carbonate, barium sulfate, silica, glass, glass fibers, alumina, titanium dioxide, and combinations thereof. More preferred fillers are talc, calcium carbonate, barium sulfate, glass fibers, and combinations thereof. As the fillers, those described in "Plastics Additives Handbook" by Zweifel Hans et al., Hanser Gardner Publications, Cincinnati, Ohio, 5th Edition, Chapter 17, pp. 901-948 (2001) may be used.

Examples of the plasticizers include mineral oils, abietic acid esters, adipic acid esters, alkylsulfonic acid esters, azelaic acid esters, benzoic acid esters, chlorinated paraffins, citric acid esters, epoxides, glycol ethers and esters thereof, glutaric acid esters, hydrocarbon oils, isobutyric acid esters, oleic acid esters, pentaerythritol derivatives, phosphoric acid esters, phthalic acid esters, polybutenes, ricinolic acid esters, sebacic acid esters, sulfonamides, trimellitic acid esters, pyromellitic acid esters, biphenyl derivatives, stearic acid esters, difuran diesters, fluorine-containing plasticizers, hydroxybenzoic acid esters, isocyanic acid ester adducts, polycyclic aromatic compounds, natural product derivatives, siloxane plasticizers, tar products, thioesters, thioethers, and combinations thereof. The content of the plasticizer in the thermoplastic polyurethane resin elastomer composition is preferably 0 to 15 mass %, more preferably 0.5 to 10 mass %, and still more preferably 1 to 5 mass %. As the plasticizers, those described in "Handbook of Plasticizers" by George Wypych, ChemTec Publishing, Toronto-Scarborough, Ontario (2004) may be used.

Examples of the colorants (dyes, pigments) include inorganic pigments such as, for example, metal oxides (for example, iron oxide, zinc oxide and titanium dioxide), mixed metal oxides, carbon blacks, and combinations thereof; organic pigments such as, for example, anthraquinones, anthanthrones, azo compounds, monoazo compounds, arylamides, benzimidazolones, BONA lakes, diketopyrrolopyrroles, dioxazines, disazo compounds, diarylide compounds, flavanthrones, indanthrones, isoindolinones, isoindolines, monoazo salts, naphthols, β-naphthols, naphthols AS, naphthol lakes, perylenes, perinones, phthalocyanines, pyranthrones, quinacridones, quinophthalones, and combinations thereof; and combinations of inorganic pigments and organic pigments. The content of the colorant in the thermoplastic polyurethane resin elastomer composition is preferably 0 to 10 mass %, more preferably 0.1 to 5 mass %, and still more preferably 0.25 to 2 mass %. As the colorants, those described in "Plastics Additives Handbook" by Zweifel Hans et al., Hanser Gardner Publications, Cincinnati, Ohio, 5th Edition, Chapter 15, pp. 813-882 (2001) may be used.

Examples of the antioxidants include aromatic amines and hindered amines such as alkyldiphenylamines, phenyl-α-naphthylamine, alkyl-substituted phenyl-α-naphthylamines, aralkyl-substituted phenyl-α-naphthylamines, alkylated p-phenylenediamines and tetramethyl-diaminodiphenylamine; phenolic compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamato)]methane (for example, IRGANOX (trademark) 1010, manufactured by Ciba Specialty Chemicals); acryloyl-modified phenols; octadecyl-3,5-di-t-butyl-4-hydroxycinnamate (for example, IRGANOX (trademark) 1076, manufactured by Ciba Specialty Chemicals); phosphorous acid esters; phosphonous acid esters; hydroxylamines; benzofuranone derivatives; and combinations thereof. The content of the antioxidant in the thermoplastic polyurethane resin elastomer composition is preferably 0 to 5 mass %, more preferably 0.0001 to 2.5 mass %, still more preferably 0.001 to 1 mass %, and particularly preferably 0.001 to 0.5 mass %. As the antioxidants, those described in "Plastics Additives Handbook" by Zweifel Hans et al., Hanser Gardner Publications, Cincinnati, Ohio, 5th Edition, Chapter 1, pp. 1-140 (2001) may be used.

Examples of the UV stabilizers include benzophenones, benzotriazoles, aryl esters, oxanilides, acrylic acid esters, formamidines, carbon blacks, hindered amines, nickel quenchers, hindered amines, phenolic compounds, metal salts, zinc compounds, and combinations thereof. The content of the UV stabilizer in the thermoplastic polyurethane resin elastomer composition is preferably 0 to 5 mass %, more preferably 0.01 to 3 mass %, still more preferably 0.1 to 2 mass %, and particularly preferably 0.1 to 1 mass %. As the UV stabilizers, those described in "Plastics Additives Handbook" by Zweifel Hans et al., Hanser Gardner Publications, Cincinnati, Ohio, 5th Edition, Chapter 2, pp. 141-426 (2001) may be used.

Examples of the heat stabilizers include phosphorus heat stabilizers. Examples of the commercial products thereof include IRGAPHOS series 38, 126 and P-EPQ (trade names) manufactured by Ciba Specialty Chemicals, and ADK STAB series PEP-4C, 11C, 24 and 36 (trade names) manufactured by ADEKA CORPORATION. When a phosphorus heat stabilizer is used, the content of the heat stabilizer in the thermoplastic polyurethane resin elastomer composition is preferably 0.05 to 1 mass %.

Examples of the flame retardants include halogenated organic flame retardants such as polybromodiphenyl ethers, ethylene bisbromophthalimide, bis(bromophenyl)ethane, bis(bromophenyl)terephthalamide and perchloropentacyclodecane; phosphorus organic flame retardants; nitrogen organic flame retardants; and inorganic flame retardants such as antimony trioxide, aluminum hydroxide and magnesium hydroxide.

Examples of the crosslinking agents include organic peroxides such as alkyl peroxides, aryl peroxides, peroxyesters, peroxycarbonates, diacyl peroxides, peroxyketals and cyclic peroxides; silane compounds such as vinyltrimethoxysilane, vinyltriethoxysilane, vinyltris(2-methoxyethoxy)silane, vinyltriacetoxysilane, vinylmethyldimethoxysilane and 3-methacryloyloxypropyltrimethoxysilane; and radical crosslinking agents having a plurality of (preferably three or more) carbon-carbon double bonds in the molecule, such as trimethylolpropane triacrylate, trimethylolpropane trimethacrylate and triacrylformal. As the crosslinking agents, those described in "Plastics Additives Handbook" by Zweifel Hans et al., Hanser Gardner Publications, Cincinnati, Ohio, 5th Edition, Chapter 14, pp. 725-812 (2001) may be used. In particular, radical crosslinking agents are preferable. Trimethylolpropane triacrylate, trimethylolpropane trimethacrylate and triacrylformal are more preferable. Trimethylolpropane triacrylate and trimethylolpropane trimethacrylate are still more preferable.

These additives may be used singly, or two or more kinds may be used in any combination and in any ratio.

The amount in which the additives are added is such that the lower limit of the mass ratio to the thermoplastic polyurethane resin elastomer of the present invention is preferably 0.01 mass %, more preferably 0.05 mass %, and still more preferably 0.1 mass %, and the upper limit thereof is preferably 10 mass %, more preferably 5 mass %, and still more preferably 1 mass %. The additives do not offer sufficient effects when added in an excessively small amount. When added in an excessively large amount, the additives may be precipitated or cause turbidity during the course of processing of a film or a shaped article using the thermoplastic polyurethane resin elastomer.

The thermoplastic polyurethane resin elastomer of the present invention may be compounded with other thermoplastic polyurethane resin elastomers and other thermoplastic elastomers such as vinyl chloride elastomers, styrene elastomers, polyolefin elastomers, polydiolefin elastomers, polyester elastomers, amide elastomers and silicon elastomers.

[Use Applications]

A shaped article of the thermoplastic polyurethane resin elastomer of the present invention has special mechanical properties, specifically, shows a small change in elastic modulus depending on temperature and has a constant tensile strength, and further exhibits excellent flexibility (stretchability) under low-temperature heating conditions and at the same time has high durability properties such as weather resistance and chemical resistance, high transparency and good texture. Thus, such a shaped article may be used in various applications where these characteristics are required.

A shaped article having the characteristics described above may be obtained by shaping the thermoplastic polyurethane resin elastomer or the thermoplastic polyurethane resin elastomer composition according to the present invention.

The thermoplastic polyurethane resin elastomer or the thermoplastic polyurethane resin elastomer composition according to the present invention may be shaped by any method without limitation. Various shaping methods generally used for thermoplastic polymers may be used. For example, any shaping methods such as injection molding, extrusion, press molding, blow molding, calendering, casting and roll processing may be adopted to produce articles having various shapes such as resin plates, films, sheets, tubes, hoses, belts, rolls, synthetic leathers, shoe soles, automobile parts, escalator handrails, road sign members and fibers.

More specifically, for example, the thermoplastic polyurethane resin elastomer of the present invention may be used in tubes and hoses in devices used in the food and medical fields such as pneumatic devices, coating devices, analytical devices, laboratory devices, metering pumps, water treatment devices and industrial robots, and also in spiral tubes and fire hoses. Further, the elastomer may be used as belts such as round belts, V-belts and flat belts in machinery such as various transmission mechanisms, spinning machines, packing machines and printing machines. Furthermore, the elastomer may be used in, for example, heel tops and soles of footwear, equipment parts such as couplings, packings, pole joints, bushes, gears and rolls, sporting goods, leisure goods and watch belts. Further, the elastomer may be used as automobile parts such as oil stoppers, gearboxes, spacers, chassis parts, interior parts and tire chain substitutes. Furthermore, the elastomer may be used as, for example, films such as keyboard films and automobile films, curl cords, cable sheaths, bellows, conveying belts, flexible containers, binders, synthetic leathers, dipping products and adhesives.

A shaped article of the thermoplastic polyurethane resin elastomer or the thermoplastic polyurethane resin elastomer composition according to the present invention may be a 30 μm to 2 mm thick film article such as a film or a sheet. Such a film article is suited as, for example, a waterproof film or a moisture permeable waterproof film for clothing, sports/outdoor clothing, bags and shoes. The film article for clothing advantageously offers high comfort and good texture by showing a small change in elastic modulus between 40° C., specifically, near body temperature during contact with the skin, and room temperature (about 23° C.) and also by having a constant tensile strength, and is advantageously highly resistant to chemicals such as oleic acid contained in sweat. Elastic fibers for clothing are a preferred application for the similar reasons. Elastic fibers are used by being blended with, for example, polyester fibers, nylon fibers or triacetate fibers, and are also used as short fibers and are fused into nonwoven fabrics. Elastic fibers called Spandex which use an ether polyol are currently used for clothing. Unfortunately, the Spandex fibers are poor in durability such as weather resistance and chemical resistance. The elastic fibers obtained by melt-spinning the non-yellowing thermoplastic polyurethane resin elastomer of the present invention can solve such problems. Other preferred applications are paint protective films for automobile exteriors, decorative films for exteriors and interiors, and synthetic leather sheets for interiors. The products in these applications require an appropriate range of mechanical properties plus excellent durability such as resistance to oleic acid and other chemicals, and transparency.

In clothing applications and automobile applications which consume large amounts of resins, in particular, there is a strong demand for the global environment protection and the prevention of global warming. The non-yellowing thermoplastic polyurethane resin elastomer of the present invention using biomass raw materials can advantageously meet such demands. Further, the greatest demand is satisfied by the thermoplastic polyurethane resin elastomer that uses biomass resources of non-edible plant origin which do not conflict with human food problems and are also desirable from the point of view of animal protection.

The thermoplastic polyurethane resin elastomer of the present invention may be used in a thermoplastic polyurethane film or a laminate film including such a thermoplastic polyurethane film. Such a film may be used as, for example, a marking film used for the surface of automobiles, ships and aircraft and also for building materials, a decorative film used for automobile interiors and exteriors, and a decorative film used for various resins, metals and glass surfaces.

EXAMPLES

The present invention will be described in more detail hereinbelow by presenting EXAMPLES and COMPARATIVE EXAMPLES. The present invention is not limited to these EXAMPLES and may be modified without departing from the spirit of the present invention.

[Evaluation Methods]

The following evaluation methods were adopted in EXAMPLES and COMPARATIVE EXAMPLES below.

[Methods for Evaluating Polycarbonate Diols]

<Hydroxyl Value and Number Average Molecular Weight>

The hydroxyl value of a polycarbonate diol was measured using an acetylation reagent by a method in accordance with JIS K1557-1. Further, the number average molecular weight was determined from the hydroxyl value using the following equation (1).

$$\text{Number average molecular weight}=2\times56.1/(\text{hydroxyl value}\times10^3) \quad (1)$$

<Molar Ratio of Repeating Units (B) to Repeating Units (A)>

A polycarbonate diol was dissolved into $CDCl_3$, and a H-NMR spectrum was measured at 400 MHz (AL-400 manufactured by JEOL Ltd.). From the positions of the signals of the respective components, the molar ratio (B)/(A) of repeating units (B) to repeating units (A) was determined.

<Phenol Content>

A polycarbonate diol was dissolved into $CDCl_3$, and a $^1$H-NMR spectrum was measured at 400 MHz (AVANCE 400 manufactured by BRUKER). The content of phenols was calculated from the integrals of the signals of the respective components. Here, the detection limit is 100 ppm in terms of the weight of phenol.

<Magnesium Content>

Approximately 0.1 g of a polycarbonate diol was weighed out and was dissolved into 4 mL of acetonitrile. Thereafter, 20 mL of pure water was added to precipitate the polycarbonate diol. The polycarbonate diol precipitated was removed by filtration. The solution after the filtration was diluted with pure water to a predetermined concentration, and the metal ion concentration was analyzed by ion chromatography. The metal ion concentration in acetonitrile used as the solvent was measured as the blank value, and the metal ion concentration in the polycarbonate diol after subtraction of the metal ion concentration in the solvent was determined. The measurement conditions are described in Table 1 below. The magnesium ion concentration was determined using the analysis results and a calibration curve prepared beforehand.

TABLE 1

| Metal ion concentration measurement conditions | |
|---|---|
| | Cation |
| Analyzers | "DX-320" Nippon Dionex KK.<br>Chromatopac: "C-R7A" Shimadzu Corporation |
| Separation column | IonPac CS12A |
| Guard column | IonPac CG12A |
| Flow rate | 1.0 mL/min |
| Injection volume | 1.5 mL |
| Pressure | 960-990 psi |
| OVEN TEMP | 35° C. |
| Detector sensitivity | RANGE 200 μS |
| Suppressor | CSRS Current value: 60 mA |
| Eluent | 20 mmol/L Methanesulfonic acid |
| Retention time | Mg: 10.9 min<br>Ca: 13.0 min<br>Ba: 19.4 min |

[Methods for Evaluating Thermoplastic Polyurethane Resin Elastomer Films and Thermoplastic Polyurethane Resin Elastomers]

<Molecular Weight of Thermoplastic Polyurethane Resin Elastomers>

A thermoplastic polyurethane resin elastomer film was dissolved into dimethylacetamide, and the concentration of the dimethylacetamide solution was adjusted to 0.14 mass %. The dimethylacetamide solution was injected into a GPC device [product name: "HLC-8220" manufactured by TOSOH CORPORATION (columns: two TskgelGMH-XL columns)], and the weight average molecular weight (Mw) and the number average molecular weight (Mn) of the thermoplastic polyurethane resin elastomer were measured using standard polystyrenes. The molecular weight distribution (Mw/Mn) was then calculated.

<Melt Viscosity>

The melt mass flow rate (MFR) was measured with a melt mass flow rate measuring device (device name: Melt Indexer, manufactured by TATEYAMA KAGAKU CO., LTD.) under a load of 2.16 kg in accordance with JIS 7210 (ISO 1133). The melt viscosity was measured under the condition of 190° C.

<Hardness>

The hardness was measured with respect to pellets of a thermoplastic polyurethane resin elastomer. A fluororesin sheet and a melt-forming mold were installed in this order onto a plate of a hot press machine (product name: "MINI TEST PRESS", manufactured by Toyo Seiki Seisaku-sho, Ltd.). The melt-forming mold that was used was 4 cm×4 cm×2 mm in thickness. The pellets were placed into the mold and were covered with a fluororesin sheet on top thereof. The thermoplastic polyurethane resin elastomer was melted using the plate of the hot press machine (pressure: 1 MPa×temperature: 180° C.×time: 5 minutes). After melting, the pressure setting of the hot press machine was gradually increased, and the elastomer was heated and shaped at a maximum pressure of 10 MPa for 5 minutes. Thereafter, the pressure of the hot press machine was lowered, and the mold was taken out and was installed into a cooling press machine (product name: "MINI TEST PRESS", manufactured by Toyo Seiki Seisaku-sho, Ltd.) and rapidly cooled (pressure: 10 MPa×time: 2 minutes). Thus, a sheet of the thermoplastic polyurethane resin elastomer that was 4 cm×4 cm×2 mm in thickness was obtained. In accordance with JIS K6253 (2012), three sheets of the thermoplastic polyurethane resin elastomer each having a thickness of 2 mm were stacked on top of one another to give a specimen having a thickness of 6 mm. Using a rubber hardness meter [model number: "GS-719N (A-TYPE)" manufactured by TEFLOCK Co., Ltd.], the pressure plate of the rubber hardness meter was brought into contact with the specimen, and the measurement value after 10 seconds [Shore A hardness] was read. The measurement was performed at five contact points separated from one another by at least 6 mm, and the results were averaged.

<Hue (YI)>

A thermoplastic polyurethane resin elastomer film was irradiated with a 12 V, 20 W halogen lamp as a light source for 5 seconds. The reflected light was detected with colorimeter ZE-6000 (manufactured by NIPPON DENSHOKU INDUSTRIES Co., Ltd.). The YI was measured under the conditions of D65 light source and 2 degrees field of view based on JIS K7373.

<Appearance (Transparency)>

To evaluate the transparency of the above sheet of the thermoplastic polyurethane resin elastomer (the melt-formed sheet sample 4 cm×4 cm×2 mm in thickness), three evaluators tried to read letters behind the sheet visually through the sheet. The transparency was rated as 1 when the sheet was transparent and the letters were clearly visible; rated as 2 when the sheet was cloudy and the letters were not clearly visible; and rated as 3 when the sheet was white and the letters were almost invisible. The final rating was determined by a majority vote by the three evaluators. The transparency is excellent when rated as 1, but is opaque and does not offer a satisfactory appearance when rated as 2 or 3.

<Tensile Test>

In accordance with JIS K6301 (2010), a strip specimen 10 mm in width, 100 mm in length and about 50 μm in thickness was cut out from a film of a thermoplastic polyurethane resin elastomer and was tensile tested on a tensile tester (product name: "Tensilon UTM-III-100", manufactured by Orientec Co., Ltd.) from a chuck distance of 50 mm at a stress rate of 500 mm/min, a temperature of 23° C. or 40° C. and a relative humidity of 55% to determine the stress at 100 g elongation, 100% modulus, of the specimen. The percentage ratio of the 100% modulus measured at 40° C. (40° C. (100% M)) to the 100% modulus measured at 23° C. (23° C. 100% M)) was determined by calculating 40° C. (100% M)/23° C. (100% M).

<Oleic Acid Resistance>

A 3 cm×3 cm specimen was cut out from a thermoplastic polyurethane resin elastomer film. The mass of the specimen was measured with a precision balance. The specimen was then added to a 250 ml volume glass bottle containing 50 ml of oleic acid as a test solvent, and was allowed to stand in a nitrogen atmosphere in a thermostatic chamber at 80° C. for 16 hours. After the test, the specimen was taken out, the front and back sides were lightly wiped with a paper wiper, and the mass was measured with the precision balance to calculate the mass change (the rate of increase) from the mass before the test. The closer the mass change is to 0%, the higher the oleic acid resistance.

<Ethanol Resistance>

A 3 cm×3 cm specimen was cut out from a thermoplastic polyurethane resin elastomer film. The mass of the specimen was measured with a precision balance. The specimen was then added to a glass petri dish 10 cm in inner diameter ϕ containing 50 ml of ethanol as a test solvent, and was kept immersed therein for 1 hour at room temperature of about 23° C. After the test, the specimen was taken out and was lightly wiped with a paper wiper, and the mass was measured with the precision balance to calculate the mass change (the rate of increase) from the mass before the test. The closer the mass change is to 0%, the higher the ethanol resistance. The mass change is preferably not more than 20%, and particularly preferably not more than 15%.

<Content of Biomass Resources in Thermoplastic Polyurethane Resin Elastomers>

A thermoplastic polyurethane resin elastomer was tested to determine the carbon content by the measurement of radiocarbon (14C) described in the ASTM D6866 test standards.

[Production and Evaluation of Polycarbonate Diol]

Synthesis Example 1

A 5 L glass separable flask equipped with a stirrer, a distillate trap and a pressure regulator was charged with 1,4-butanediol of petroleum origin (hereinafter, sometimes written as "1,4BD"): 1065.2 g, 1,10-decanediol of non-edible plant (castor oil) origin (hereinafter, sometimes written as "1,10DD"): 280.9 g, diphenyl carbonate (hereinafter, sometimes written as "DPC"): 2653.9 g, and an aqueous magnesium acetate tetrahydrate solution: 7.2 mL (concentration: 8.4 g/L, magnesium acetate tetrahydrate: 60 mg) and was purged with nitrogen gas. While performing stirring, the internal temperature was raised to 160° C. to heat and dissolve the contents. Thereafter, the pressure was lowered to 24 kPa in 2 minutes, and the reaction was performed for 90 minutes while removing phenols out of the system. Next, the reaction was continued while lowering the pressure to 9.3 kPa in 90 minutes and further lowering the pressure to 0.7 kPa in 30 minutes. Thereafter, the temperature was raised to 170° C. and the reaction was carried out for 60 minutes while removing phenols and the unreacted dihydroxy compounds out of the system, thereby preparing a polycarbonate diol-containing composition. Thereafter, a 0.85 mass % aqueous phosphoric acid solution: 2.8 mL was added to deactivate magnesium acetate. A polycarbonate diol-containing composition was thus obtained.

The polycarbonate diol-containing composition obtained was fed to a thin-film distillation apparatus at a flow rate of about 20 g/min to perform thin-film distillation (temperature: 170° C., pressure: 53 to 67 Pa). The thin-film distillation apparatus used was molecular distillation apparatus MS-300 from SIBATA SCIENTIFIC TECHNOLOGY LTD. equipped with a jacket and an internal condenser 50 mm in diameter, 200 mm in height and 0.0314 $m^2$ in area.

The content of phenols in the polycarbonate diol obtained by thin-film distillation was not more than 100 mass ppm. The magnesium content was not more than 100 mass ppm.

The polycarbonate diol produced in SYNTHESIS EXAMPLE 1 is written as "PCD1".

Table 2 describes the results of evaluation of the chemical properties of PCD1.

TABLE 2

| | PCD1 |
|---|---|
| Molar ratio (B)/(A) | 0.11 |
| Hydroxyl value (mg-KOH/g) | 56.1 |
| Number average molecular weight (Mn) | 2000 |

[Commercial Polyol]

A polycaprolactone produced from ε-caprolactone as a raw material ("PLACCEL (registered trademark)", grade: PCL220, number average molecular weight (Mn): 2000, manufactured by Daicel Corporation) was used as a polyol for COMPARATIVE EXAMPLE. This polycaprolactone is written as "PCL".

[Production and Evaluation of Thermoplastic Polyurethane Films]

Example 1

PCD1, 4,4'-dicyclohexylmethane diisocyanate (hereinafter, sometimes written as "H12MDI") and 1,4-butanediol (hereinafter, sometimes written as "1,4BD") which had been each preheated to 80° C. were placed into a storage tank of an extruder equipped with a stirrer so that the ratio represented by hydroxyl equivalent (EIII) of PCD1:isocyanate equivalent (EI) of H12MDI:hydroxyl equivalent (EII) of 1,4BD would be 1.00:3.28:2.30 ((EI)/((EII)+(EIII))=0.995). Further, NEOSTANN U-830 (hereinafter, U-830, manufactured by NITTO KASEI CO., LTD.) as a urethane-forming catalyst was added in an amount of 2 weight ppm relative to the total weight of PCD1 and H12MDI. Next, all the components were rapidly mixed together with a mixer at a rotational speed of 2000 rpm, and the mixture was continuously supplied through a metering pump into a coaxial twin-screw extruder while controlling the in-machine polymerization temperature in the range of 140° C. to 220° C. During this process, the rotational speed was controlled to 250 rpm, and the residence time in the extruder was controlled to 1 minute to 3 minutes. The strands continuously extruded at the die outlet were cooled in water and were cut with a pelletizer. The pellets were then dried at 100° C. for 24 hours.

Using a short-screw extruder equipped with a 50 mm-diameter inflation die, the pellets of the thermoplastic polyurethane resin elastomer thus obtained were continuously formed into a 150 μm thick film at both a cylinder temperature and a die temperature of 200° C. The film take-up speed in this process was 6 m/min.

The thermoplastic polyurethane resin elastomer film obtained was evaluated as described hereinabove, the results being described in Table 3.

Examples 2, and Comparative Example 1

Thermoplastic polyurethane resin elastomer films were obtained and evaluated in the same manner as in EXAMPLE 1, except that the raw materials that were used were changed as described in Table 3. The evaluation results are shown in Table 3.

TABLE 3

| | | | EX. 1 | EX. 2 | COMP. EX. 1 |
|---|---|---|---|---|---|
| Molecular weight of polyol | | Mn | 2000 | 2000 | 2000 |
| Type of polyol | | — | PCD1 | PCD1 | PCL |
| Type of polyisocyanate compound | | — | H12MDI | H12MDI | H12MDI |
| Type of chain extender | | — | 1,4BD | 1,4BD | 1,4BD |
| Raw material equivalent ratio | H12MDI | (EI) | 3.28 | 3.78 | 4.98 |
| | 1,4BD | (EII) | 2.30 | 2.8 | 4.00 |
| | Polyol | (EIII) | 1.00 | 1.0 | 1.00 |
| | (EI)/((EII) + (EIII)) | | 0.995 | 0.995 | 0.995 |
| Biobased carbon content | | % | 13.4 | 12.6 | 0 |
| Molecular weight of thermoplastic polyurethane resin elastomer | | Mn | 63000 | 64000 | 71000 |
| | | Mw | 119000 | 119000 | 132500 |
| | | Mw/Mn | 1.9 | 1.9 | 1.9 |
| MFR | 190° C. | g/10 min | 0.54 | 2.03 | — |
| Hardness | 2 mm × 3 sheets | Shore A | 88 | 92 | — |
| Hue (Y1) | D65 light source, 2 degrees | — | 1.2 | 0.7 | — |
| Appearance (transparency) | Visual evaluation | — | 1 | 1 | 1 |
| Tensile test | 23° C. | 100% M [MPa] | 3.6 | 5.6 | 7.2 |
| | 40° C. | 100% M [MPa] | 2.0 | 4.2 | 6.0 |
| | 40° C. (100% M)/2° C. (100% M) | | 77.8 | 75.0 | 83.3 |
| Chemical resistance | Oleic acid | Rate of mass increase [%] | 24.9 | 29.2 | 78.8 |
| | Ethanol | Rate of mass increase [%] | 18.6 | 12.9 | 29.0 |

The following can be seen from Table 3.

COMPARATIVE EXAMPLE 1 in which polycaprolactone was used as the polyol resulted in very low chemical resistance, although 40° C. (100% M)/23° C. (100% M) was satisfactorily high similarly to EXAMPLE 1 that used PCD1.

In contrast, the thermoplastic polyurethane resin elastomers in EXAMPLES 1 and 2 were produced by reacting a polyol that was a copolymerized polycarbonate diol (IIIA) having a repeating unit (A) and a repeating unit (B), an alicyclic isocyanate compound, and a chain extender in a predetermined ratio. These elastomers had high 40° C. (100% M)/23° C. (100% M), were acceptable in transparency and rated as 1, and showed excellent chemical resistance.

Example 3

A separable flask equipped with a thermocouple and a stirrer was charged with 67.70 g of PCD1, 6.10 g of 1,4-BD, 235.41 g of dehydrated N,N-dimethylformamide and 370 mg of a urethane-forming catalyst (NEOSTANN U-830) which had been each preheated to 80° C. The separable flask was immersed in an oil bath preset at 55° C., and the inside of the separable flask was stirred at 60 rpm for about 1 hour while performing heating in a nitrogen atmosphere. After PCD1 had been dissolved into the solvent, 23.50 g of H12MDI was added. Thirty minutes after the increase in internal temperature due to the heat of reaction subsided and the temperature started to decrease, approximately 1 g additional portions of H12MDI were added. The addition of the additional H12MDI portions was repeated, and finally a total of 26.10 g of H12MDI was added. A polyurethane solution was thus obtained.

The polyurethane solution obtained was applied onto a fluororesin sheet (fluororesin tape NITOFLON 900, thickness: 0.1 mm, manufactured by NITTO DENKO CORPORATION) with a 500 μm applicator, and was dried sequentially at 50° C. for 5 hours, 100° C. for 0.5 hours, and, under vacuum conditions, at 100° C. for 0.5 hours, and 80° C. for 15 hours. A thermoplastic polyurethane resin elastomer film was thus obtained.

The thermoplastic polyurethane resin elastomer film obtained was evaluated as described hereinabove, the results being described in Table 4.

Example 4, and Comparative Examples 2

Thermoplastic polyurethane resin elastomer films were obtained and evaluated in the same manner as in EXAMPLE 3, except that the raw materials that were used were changed as described in Table 4. The evaluation results are shown in Table 4.

HD-PCD used as the polyol in COMPARATIVE EXAMPLE 2 is a homopolymerized polycarbonate diol obtained using only 1,6-hexanediol as raw material diols.

TABLE 4

| | | | EX. 3 | EX. 4 | COMP. EX. 2 |
|---|---|---|---|---|---|
| Molecular weight of polyol | | Mn | 2000 | 2000 | 2000 |
| Type pf polyol | | — | PCD1 | PCD1 | HD-PCD |
| Type of isocyanate compound | | — | H12MDI | HDI | H12MDI |
| Type of chain extender | | — | 1,4BD | 1,4BD | 1,4BD |
| Raw material equivalent ratio | H12MDI | (EI) | 2.99 | 2.94 | 2.97 |
| | 1,4BD | (EII) | 2 | 2 | 2 |

TABLE 4-continued

| | | | EX. 3 | EX. 4 | COMP. EX. 2 |
|---|---|---|---|---|---|
| Polyol | | (EIII) | 1 | 1 | 1 |
| (EI)/((EII) + (EIII)) | | | 0.995 | 0.980 | 0.990 |
| Biobased carbon content | | | 13.9 | 163 | 0.0 |
| Molecular weight of thermoplastic polyurethane resin elastomer | | Mn | 75000 | 69000 | 64000 |
| | | Mw | 140000 | 127000 | 122000 |
| | | Mw/Mn | 1.9 | 1.8 | 1.9 |
| Appearance (transparency) | Visual evaluation | | 1 | 2 | 1 |
| Tensile test | 23° C. | 100% M [MPa] | 5.1 | 9.4 | 5.2 |
| | 40° C. | 100% M [MPa] | 4.0 | 8.8 | 3.4 |
| | 40° C. (100% M)/2° C. (100% M) | | 78.4 | 94.1 | 65.4 |
| Chemical resistance | Oleic acid | Rate of mass increase [%] | 35.6 | 6.5 | 82.6 |
| | Ethanol | Rate of mass increase [%] | 20.7 | 7.9 | 22.2 |

The following can be seen from Table 4.

In COMPARATIVE EXAMPLE 2 which used HD-PCD as the polyol, 40° C. (100% M)/23° C. (100% M) was low, in other words, the 100% modulus changed greatly between temperatures of 23° C. and 40° C., and the elastomer was unable to perform stably at varied temperatures and was thus limited in applicability. Further, the rates of mass increase were high in the chemical soaking test with oleic acid and also with ethanol, showing that the elastomer was unsatisfactory in durability for use in parts frequently touched by human beings or in applications requiring sterilization.

In contrast, EXAMPLES 3 and 4 used PCD1 as the polyol that was a copolymerized polycarbonate diol (IIIA) having a repeating unit (A) and a repeating unit (B), and the thermoplastic polyurethane resin elastomers in these examples were produced by reacting the copolymerized polycarbonate diol (IIIA), the alicyclic isocyanate compound, and the chain extender in a predetermined ratio. These elastomers had as high 40° C. (100% M)/23° C. (100% M) as 78.4% and 94.1%, respectively. These results show that the value of 100% modulus does not change significantly between 40° C. and 23° C., and the properties are less susceptible to a temperature change. Further, these elastomers outperformed the elastomer of COMPARATIVE EXAMPLE 2 in chemical resistance. In particular, these elastomers showed excellent chemical resistance to oleic acid contained in human sebum and sweat, and had good applicability to parts touched by human beings.

While the present invention has been described in detail with respect to some specific embodiments, the skilled person will appreciate that various modifications are possible within the spirit and scope of the invention.

This application is based upon Japanese Patent Applications Nos. 2019-083088 and 2019-083089 filed on Apr. 24, 2019, the entire contents of which are incorporated herein by reference.

The invention claimed is:

1. A thermoplastic polyurethane resin elastomer obtained by mixing at least an isocyanate compound (I), an aliphatic alcohol (II) which is at least one aliphatic alcohol selected from the group consisting of ethylene glycol, 1,3-propanediol, 1,4-butanediol, 1,5-pentanediol and 1,6-hexanediol, and a polyol (III) having a number average molecular weight determined from the hydroxyl value of not less than 300 and not more than 10,000, so that the isocyanate compound (I), the aliphatic alcohol (II), and the polyol (III) are reacted, wherein the isocyanate compound (I) comprises an alicyclic isocyanate compound containing two isocyanate groups, and optionally an aliphatic isocyanate compound containing two isocyanate groups, a total amount of the alicyclic isocyanate compound and the aliphatic isocyanate compound being not less than 90 mol % in the isocyanate compound (I), and an amount of the alicyclic isocyanate compound containing two isocyanate groups being not less than 80 mol %, the polyol (III) comprises not less than 80 mol % of a copolymerized polycarbonate diol (IIIA) including a linear repeating structural unit represented by the formula (A) and a repeating structural unit represented by the formula (B), the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0-5.5:1.0-4.5, with the proviso that 0.95≤(EI)/((EII)+ (EIII))≤1.05, and the number average molecular weight determined from the hydroxyl value of the copolymerized polycarbonate diol (IIIA) is not less than 500 and not more than 5,000,

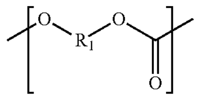

(A)

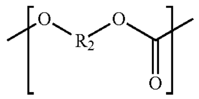

(B)

wherein in the formula (A), $R_1$ independently represents n-propane, n-butane, or n-pentane and in the formula (B), $R_2$ independently represents a C6-C20 hydrocarbon group.

2. The thermoplastic polyurethane resin elastomer according to claim 1, wherein the equivalent ratio is 0.97≤(EI)/((EII)+(EIII))≤1.03 wherein (EIII) is the hydroxyl equivalent of the polyol (III), (EI) is the isocyanate equivalent of the isocyanate compound (I), and (EII) is the hydroxyl equivalent of the aliphatic alcohol (II).

3. The thermoplastic polyurethane resin elastomer according to claim 1, wherein in the formula (B), $R_2$ independently represents a C8-C20 hydrocarbon group.

4. The thermoplastic polyurethane resin elastomer according to claim 1, wherein in the formula (B), $R_2$ independently represents n-dodecane, n-decane, n-nonane, n-octane, or n-hexane.

5. The thermoplastic polyurethane resin elastomer according to claim 1, wherein the aliphatic isocyanate compound and/or the alicyclic isocyanate compound each containing two isocyanate groups in the molecule is one, or two or more selected from the group consisting of 1,6-hexamethylene diisocyanate, 4,4'-dicyclohexylmethane diisocyanate, 1,3-bis(isocyanatomethyl)cyclohexane, 1,5-pentamethylene diisocyanate and isophorone diisocyanate.

6. A thermoplastic polyurethane resin elastomer obtained by mixing at least an isocyanate compound (I), an aliphatic alcohol (II) which is at least one aliphatic alcohol selected from the group consisting of ethylene glycol, 1,3-propanediol, 1,4-butanediol, 1,5-pentanediol and 1,6-hexanediol, and a polyol (III) having a number average molecular weight determined from the hydroxyl value of not less than 300 and not more than 10,000, so that the isocyanate compound (I), the aliphatic alcohol (II), and the polyol (III) are reacted, wherein the isocyanate compound (I) comprises an alicyclic isocyanate compound containing two isocyanate groups, and optionally an aliphatic isocyanate compound containing two isocyanate groups, a total amount of the alicyclic isocyanate compound and the aliphatic isocyanate compound being not less than 90 mol % in the isocyanate compound (I), and an amount of the alicyclic isocyanate compound containing two isocyanate groups being not less than 80 mol %, the polyol (III) comprises not less than 80 mol % of a copolymerized polycarbonate diol (IIIA) including a linear repeating structural unit represented by the formula (A) and a repeating structural unit represented by the formula (B), the equivalent ratio represented by hydroxyl equivalent (EIII) of polyol (III): isocyanate equivalent (EI) of isocyanate compound (I):hydroxyl equivalent (EII) of aliphatic alcohol (II) is 1.0:2.0-5.5:1.0-4.5, with the proviso that $0.95 \leq (EI)/((EII)+(EIII)) \leq 1.05$, the number average molecular weight determined from the hydroxyl value of the copolymerized polycarbonate diol (IIIA) is not less than 500 and not more than 5,000, (A)

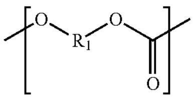

(B)

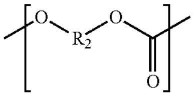

wherein in the formula (A), $R_1$ independently represents n-propane, n-butane, or n-pentane, and in the formula (B), $R_2$ independently represents a C6-C20 hydrocarbon group, and the content of a biomass resource in the thermoplastic polyurethane resin elastomer is not less than 10 mass %.

7. The thermoplastic polyurethane resin elastomer according to claim 6, wherein the content of a biomass resource of non-edible plant origin in raw material diols for the polyol (III) is not less than 10 mass %.

8. The thermoplastic polyurethane resin elastomer according to claim 1, wherein when the thermoplastic polyurethane resin elastomer is formed into a strip specimen in accordance with JIS K6301 (2010) having a width of 10 mm, a length of 100 mm and a thickness of about 50 μm, and when the specimen is tensile tested on a tensile tester, the product name of which is "Tensilon UTM-III-100", manufactured by Orientec Co., Ltd., from a chuck distance of 50 mm at a stress rate of 500 mm/min, temperatures of 23° C. and 40° C. and a relative humidity of 55% to determine a 100% modulus, which is the stress at 100% elongation, the strength ratio by percentage of the 100% modulus measured at 40° C. to the 100% modulus measured at 23° C. is not less than 70%, and wherein a rate of mass increase is not more than 40% as measured in the following manner: a 3 cm×3 cm specimen is cut out from a film including the thermoplastic polyurethane resin elastomer; a mass of the specimen is measured with a precision balance; the specimen is then added to a 250 ml volume glass bottle containing 50 ml of oleic acid as a test solvent, and is allowed to stand in a nitrogen atmosphere in a thermostatic chamber at 80° C. for 16 hours: thereafter, the specimen is taken out from the glass bottle; front and back sides of the specimen are wiped with a paper wiper; and a mass of the specimen is measured with the precision balance to calculate the rate of mass increase from the mass of the specimen before contacting the test solvent.

9. A method for producing a thermoplastic polyurethane resin elastomer comprising mixing at least an isocyanate compound (I), an aliphatic alcohol (II) which is at least one aliphatic alcohol selected from the group consisting of ethylene glycol, 1,3-propanediol, 1,4-butanediol, 1,5-pentanediol and 1,6-hexanediol, and a polyol (III) having a number average molecular weight determined from the hydroxyl value of not less than 300 and not more than 10,000, so that the isocyanate compound (I), the aliphatic alcohol (II), and the polyol (III) are reacted, wherein the isocyanate compound (I) comprises an alicyclic isocyanate compound containing two isocyanate groups, and optionally an aliphatic isocyanate compound containing two isocyanate groups, a total amount of the alicyclic isocyanate compound and the aliphatic isocyanate compound being not less than 90 mol % in the isocyanate compound (I), and an amount of the alicyclic isocyanate compound containing two isocyanate groups being not less than 80 mol %, the polyol (III) comprises not less than 80 mol % of a copolymerized polycarbonate diol (IIIA) including a linear repeating structural unit represented by the formula (A) and a repeating structural unit represented by the formula (B), and the equivalent ratio represented by hydroxyl equivalent (EIII) of polyol (III):isocyanate equivalent (EI) of isocyanate compound (I):hydroxyl equivalent (EII) of aliphatic alcohol (II) is 1.0:2.0-5.5:1.0-4.5, with the proviso that $0.95 \leq (EI)/((EII)+(EIII)) \leq 1.05$, (A)

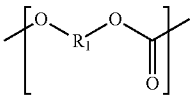

-continued

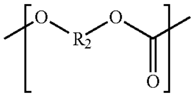

(B)

wherein in the formula (A), $R_1$ independently represents n-propane, n-butane, or n-pentane, and in the formula (B), $R_2$ independently represents a C6-C20 hydrocarbon group.

10. The method according to claim 9, wherein the isocyanate compound (I), the aliphatic alcohol (II) and the polyol (III) are mixed with one another by stirring without a solvent, and the mixture is supplied to a device in which the mixture is continuously mixed, reacted and extruded, thereby producing a thermoplastic polyurethane resin elastomer continuously.

11. A thermoplastic polyurethane resin elastomer composition comprising the thermoplastic polyurethane resin elastomer described in claim 1, and one, or two or more kinds of additives selected from the group consisting of hindered phenolic antioxidants, UV absorbers, light stabilizers and lubricants.

12. A thermoplastic polyurethane film article with a thickness of 30 μm to 2 mm obtained using the thermoplastic polyurethane resin elastomer described in claim 1.

13. A film for automobile exteriors, a decorative film for interiors and exteriors, or a synthetic leather sheet for interiors obtained using the thermoplastic polyurethane resin elastomer film article described in claim 12.

14. A film for clothing obtained by shaping the thermoplastic polyurethane resin elastomer described in claim 1.

15. A polyurethane elastic fiber obtained by melt-spinning the thermoplastic polyurethane resin elastomer described in claim 1.

16. A thermoplastic polyurethane film article with a thickness of 30 μm to 2 mm obtained using the thermoplastic polyurethane resin elastomer composition described in claim 11.

17. A film for automobile exteriors, a decorative film for interiors and exteriors, or a synthetic leather sheet for interiors obtained using the thermoplastic polyurethane resin elastomer film article described in claim 16.

18. A film for clothing obtained by shaping the thermoplastic polyurethane resin elastomer composition described in claim 11.

19. A polyurethane elastic fiber obtained by melt-spinning the thermoplastic polyurethane resin elastomer composition described in claim 11.

20. The thermoplastic polyurethane resin elastomer according to claim 1, wherein a ratio of (EII) to (EIII) is from 1.5 to 4.0.

21. The thermoplastic polyurethane resin elastomer according to claim 20, wherein a ratio of a 100% modulus measured at 40° C. to the 100% modulus measured at 23° C. is not less than 70%, the 100% modulus being a stress at 100% elongation, the stress being measured with a tensile tester, with a chuck distance of 50 mm at a stress rate of 500 mm/min, temperatures of 23° C. and 40° C. and a relative humidity of 55%, for a strip specimen of the thermoplastic polyurethane resin elastomer, the strip specimen being in accordance with JIS K6301 (2010) having a width of 10 mm, a length of 100 mm and a thickness of about 50 μm.

22. The thermoplastic polyurethane resin elastomer according to claim 21, wherein the ratio of (EII) to (EIII) is from 1.5 to 2.8, and the ratio of the 100% modulus measured at 40° C. to the 100% modulus measured at 23° C. is not less than 75.0%.

23. The thermoplastic polyurethane resin elastomer according to claim 1, wherein the thermoplastic polyurethane resin elastomer has a durometer hardness of Shore A70 or more and D80 or less, and has a yellow index of 10 or less.

24. The thermoplastic polyurethane resin elastomer according to claim 6, wherein the thermoplastic polyurethane resin elastomer has a durometer hardness of Shore A70 or more and D80 or less, and has a yellow index of 10 or less.

25. The method according to claim 9, wherein the produced thermoplastic polyurethane resin elastomer has a durometer hardness of Shore A70 or more and D80 or less, and has a yellow index of 10 or less.

* * * * *